(12) United States Patent
Bohn et al.

(10) Patent No.: US 12,647,863 B1
(45) Date of Patent: Jun. 2, 2026

(54) SYSTEM AND METHOD FOR SELECTING AMONG MULTIPLE SATELLITE NETWORK PATHS AT A USER TERMINAL

(71) Applicant: Space Exploration Technologies Corp., Hawthorne, CA (US)

(72) Inventors: Andrew D. Bohn, Duvall, WA (US); Michael Nicolls, Portola Valley, CA (US); Yashodhan Dandekar, Cupertino, CA (US)

(73) Assignee: Space Exploration Technologies Corp., Starbase, TX (US)

( * ) Notice: Subject to any disclaimer, the term of this patent is extended or adjusted under 35 U.S.C. 154(b) by 347 days.

(21) Appl. No.: 18/392,815

(22) Filed: Dec. 21, 2023

Related U.S. Application Data

(60) Provisional application No. 63/435,120, filed on Dec. 23, 2022.

(51) Int. Cl.
| | |
|---|---|
| *H04W 4/00* | (2018.01) |
| *H04B 7/185* | (2006.01) |
| *H04W 36/08* | (2009.01) |
| *H04W 36/30* | (2009.01) |
| *H04W 72/0446* | (2023.01) |

(52) U.S. Cl.
CPC ...... *H04W 36/083* (2023.05); *H04B 7/18584* (2013.01); *H04W 36/30* (2013.01); *H04W 72/0446* (2013.01)

(58) Field of Classification Search
CPC ............... H04W 36/083; H04W 36/30; H04W 72/0446; H04W 80/04; H04W 36/18; H04W 36/0011; H04W 36/14; H04W 36/08; H04B 7/18584
See application file for complete search history.

(56) References Cited

U.S. PATENT DOCUMENTS

| | | | | | |
|---|---|---|---|---|---|
| 6,157,621 | A | * | 12/2000 | Brown | ................. H01Q 25/008 |
| | | | | | 370/310 |
| 7,142,521 | B2 | * | 11/2006 | Haugli | ............... H04B 7/18513 |
| | | | | | 370/320 |
| 11,336,364 | B1 | | 5/2022 | Masoomzadeh | |
| 11,411,640 | B2 | | 8/2022 | Rothaar et al. | |
| 11,595,113 | B1 | | 2/2023 | Dickinson et al. | |
| 11,664,877 | B1 | | 5/2023 | Wang et al. | |
| 11,671,850 | B1 | | 6/2023 | Jayasimha et al. | |

(Continued)

*Primary Examiner* — Phuongchau Ba Nguyen
(74) *Attorney, Agent, or Firm* — Polsinelli PC

(57) ABSTRACT

A user terminal for a satellite communication system is programmed to receive data specifying candidate satellites of a plurality of satellites as being available for links during a plurality of time slots. The user terminal is assigned to a ground network point-of-presence (PoP). The candidate satellites are scheduled to communicate with different ones of a plurality of gateway terminals during each time slot. The user terminal can, during a first time slot, transmit first data requests to one of the candidate satellites; detect a deviation from a communication quality threshold on a communication path between the phased array antenna and the ground network PoP; and in response to the detection, transmit second data requests to another candidate satellite. Additionally or alternatively, the user terminal can proactively avoid a communication interruption related to obstructed lines of sight of a phased array antenna of the user terminal by switching between candidate satellites.

20 Claims, 12 Drawing Sheets

700

RECEIVING, PRIOR TO AN INITIAL TIME SLOT, TOPOLOGY SCHEDULE DATA SPECIFYING AT LEAST TWO CANDIDATE SATELLITES AS BEING AVAILABLE FOR UT-SAT LINKS DURING EACH OF A PLURALITY OF TIME SLOTS, WHEREIN THE CANDIDATE SATELLITES ARE SCHEDULED TO COMMUNICATE WITH DIFFERENT GATEWAY TERMINALS DURING EACH TIME SLOT
704

DURING A FIRST TIME SLOT, COMMANDING PHASED ARRAY ANTENNA TO TRANSMIT A FIRST DATA REQUEST TO ONE OF THE CANDIDATE SATELLITES IDENTIFIED FOR THE FIRST TIME SLOT
708

DURING THE FIRST TIME SLOT AND SUBSEQUENT TO TRANSMITTING THE FIRST DATA REQUEST, DETECTING A DEVIATION FROM A COMMUNICATION QUALITY THRESHOLD ON A COMMUNICATION PATH BETWEEN THE PHASED ARRAY ANTENNA AND THE GROUND NETWORK POP
712

DURING THE FIRST TIME SLOT AND IN RESPONSE TO DETECTING THE DEVIATION, COMMANDING THE PHASED ARRAY ANTENNA TO TRANSMIT A SECOND DATA REQUEST TO ANOTHER OF THE CANDIDATE SATELLITES IDENTIFIED FOR THE FIRST TIME SLOT
716

(56)  References Cited

U.S. PATENT DOCUMENTS

| 11,729,633 | B2 | 8/2023 | Smoot et al. | |
| 11,791,873 | B1 | 10/2023 | Chopra et al. | |
| 12,035,150 | B2 | 7/2024 | Smoot et al. | |
| 12,081,252 | B1 | 9/2024 | Xue et al. | |
| 12,218,816 | B2 * | 2/2025 | Wang | H04B 7/18508 |
| 2021/0314057 | A1 | 10/2021 | Gazelle | |
| 2023/0164089 | A1 * | 5/2023 | Greene | H04B 7/18521 |
| | | | | 709/226 |

* cited by examiner

700

RECEIVING, PRIOR TO AN INITIAL TIME SLOT, TOPOLOGY SCHEDULE DATA SPECIFYING AT LEAST TWO CANDIDATE SATELLITES AS BEING AVAILABLE FOR UT-SAT LINKS DURING EACH OF A PLURALITY OF TIME SLOTS, WHEREIN THE CANDIDATE SATELLITES ARE SCHEDULED TO COMMUNICATE WITH DIFFERENT GATEWAY TERMINALS DURING EACH TIME SLOT

704

DURING A FIRST TIME SLOT, COMMANDING PHASED ARRAY ANTENNA TO TRANSMIT A FIRST DATA REQUEST TO ONE OF THE CANDIDATE SATELLITES IDENTIFIED FOR THE FIRST TIME SLOT

708

DURING THE FIRST TIME SLOT AND SUBSEQUENT TO TRANSMITTING THE FIRST DATA REQUEST, DETECTING A DEVIATION FROM A COMMUNICATION QUALITY THRESHOLD ON A COMMUNICATION PATH BETWEEN THE PHASED ARRAY ANTENNA AND THE GROUND NETWORK POP

712

DURING THE FIRST TIME SLOT AND IN RESPONSE TO DETECTING THE DEVIATION, COMMANDING THE PHASED ARRAY ANTENNA TO TRANSMIT A SECOND DATA REQUEST TO ANOTHER OF THE CANDIDATE SATELLITES IDENTIFIED FOR THE FIRST TIME SLOT

Figure 7B:
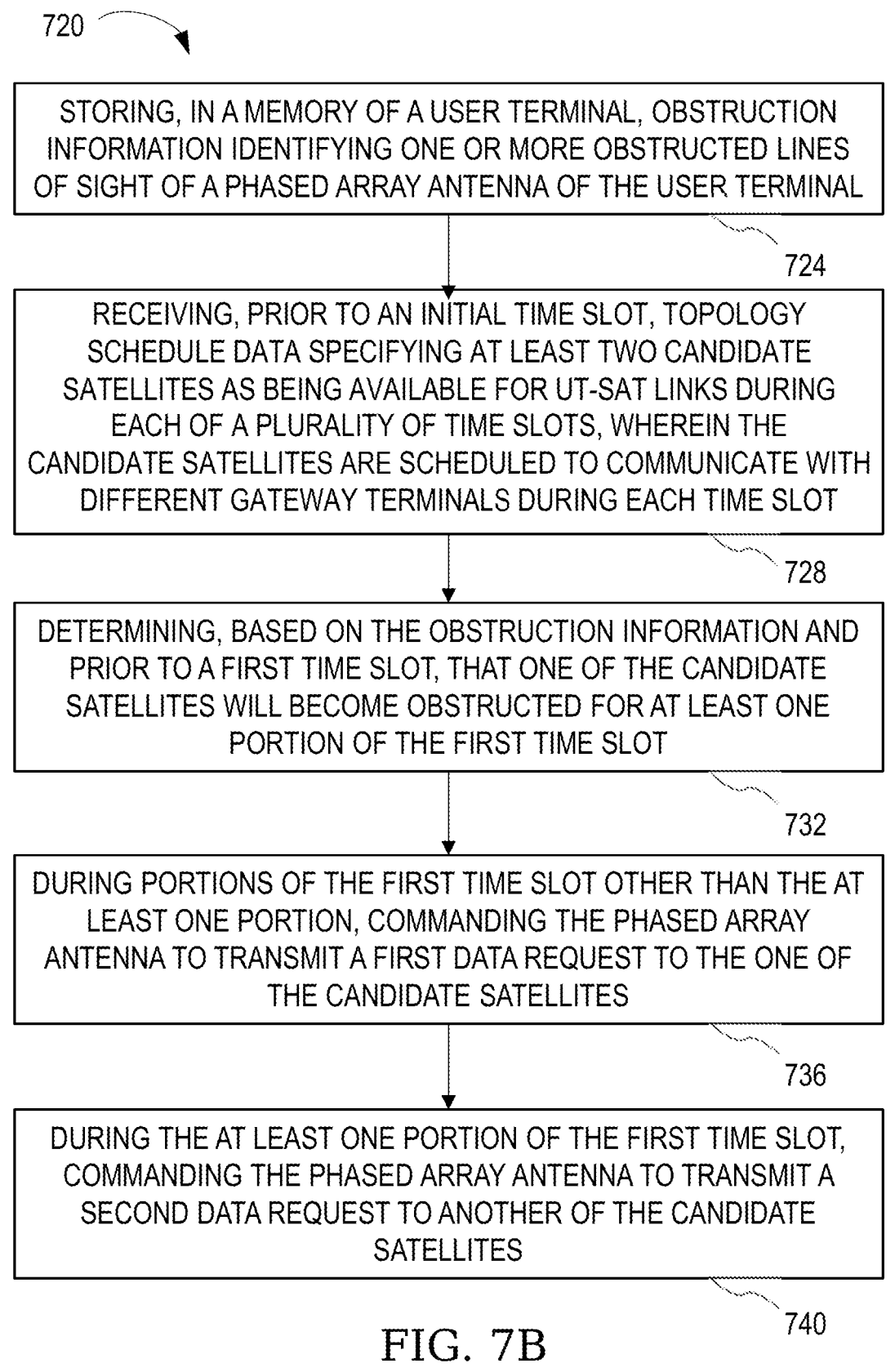

STORING, IN A MEMORY OF A USER TERMINAL, OBSTRUCTION INFORMATION IDENTIFYING ONE OR MORE OBSTRUCTED LINES OF SIGHT OF A PHASED ARRAY ANTENNA OF THE USER TERMINAL

724

RECEIVING, PRIOR TO AN INITIAL TIME SLOT, TOPOLOGY SCHEDULE DATA SPECIFYING AT LEAST TWO CANDIDATE SATELLITES AS BEING AVAILABLE FOR UT-SAT LINKS DURING EACH OF A PLURALITY OF TIME SLOTS, WHEREIN THE CANDIDATE SATELLITES ARE SCHEDULED TO COMMUNICATE WITH DIFFERENT GATEWAY TERMINALS DURING EACH TIME SLOT

728

DETERMINING, BASED ON THE OBSTRUCTION INFORMATION AND PRIOR TO A FIRST TIME SLOT, THAT ONE OF THE CANDIDATE SATELLITES WILL BECOME OBSTRUCTED FOR AT LEAST ONE PORTION OF THE FIRST TIME SLOT

732

DURING PORTIONS OF THE FIRST TIME SLOT OTHER THAN THE AT LEAST ONE PORTION, COMMANDING THE PHASED ARRAY ANTENNA TO TRANSMIT A FIRST DATA REQUEST TO THE ONE OF THE CANDIDATE SATELLITES

736

DURING THE AT LEAST ONE PORTION OF THE FIRST TIME SLOT, COMMANDING THE PHASED ARRAY ANTENNA TO TRANSMIT A SECOND DATA REQUEST TO ANOTHER OF THE CANDIDATE SATELLITES

SYSTEM AND METHOD FOR SELECTING AMONG MULTIPLE SATELLITE NETWORK PATHS AT A USER TERMINAL

CROSS REFERENCE TO RELATED APPLICATIONS

This application claims the benefit of and priority to U.S. Provisional Application No. 63/435,120, filed Dec. 23, 2022, the disclosure of which is expressly incorporated by reference herein in its entirety.

TECHNICAL FIELD

The present technology pertains to network communication paths utilizing satellites and more specifically to a user terminal that selects from among multiple independent network paths to communicate, via the satellites, with a ground-based data storage device.

BACKGROUND

Satellite communication systems can provide Internet access to user terminals at user terminal locations, for example at homes or businesses. The satellite in this context can receive, from a user terminal, a signal representing a request for data, such as a web page the user desires to view or a video a user desires to watch by way of non-limiting examples. The user will typically be at a user device which can be a computing device such as a computer or a mobile device. The user device gains access to the Internet via the user terminal and its connection to the satellite. The satellite in turn will transmit signals to a ground station (called a gateway or terrestrial gateway) on Earth forwarding the request to obtain the data. The ground station is connected through a point-of-presence to the Internet or another ground-based network or data storage device that stores the requested data. The satellite and the ground station transmit and receive signals via a respective satellite antenna and a ground station antenna.

The point-of-presence will access the Internet or other network to obtain the desired data and return the data to the gateway, which transmits the data up to the satellite. The satellite then transmits the data down to the user terminal such that the user can access the data on a user device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This disclosure provides new approaches to reducing an effect of communication interruptions in the context of a satellite communication system. The satellite communication system uses a group of satellites in low Earth orbit (LEO) to connect user terminals with a ground-based network such as the Internet. Due to the relatively rapid motion of the LEO satellites across the sky over the user terminal, and over the gateway terminals that each connect to a point-of-presence on the ground-based network, the links among the nodes (also referred to as the "topology") of the satellite communication system between the user terminal and the ground-based network can change by the minute, and the nodes must be provided with a link schedule in advance to enable the proper connections to be made on time. This greatly increases a complexity of determining the nodes or components responsible for an unforeseen communication interruption, and a complexity of routing around the problem nodes in real time, as is required to preserve the user experience at the user terminal. Moreover, while the nominal link schedule may be determined and propagated in advance from a central network control location, analyzing real-time communication disruptions and attendant re-routing decisions at the central network control location adds unacceptable delays from the point of view of the remote user terminals. This disclosure addresses such problems by configuring each user terminal to independently detect, in quasi-real time, a communication deterioriation caused by any node between the user terminal and the ground-based network. If a problem is detected, the user terminal is configured to immediately react by switching to an alternative network path through the satellite communication system, without waiting for any commands or analysis provided by a central network control location. The alternative network path is provisioned in advance to have no nodes (i.e., no satellites and no gateway terminals) in common with the interrupted path. Additionally or alternatively, the user terminal is configured to proactively avoid a communication interruption related to obstructed lines of sight of a phased array antenna of the user terminal, by locally storing information about obstructed lines of sight of the user terminal, and proactively switching to the alternative network path when the user terminal predicts that a currently linked satellite is moving into an obstruction zone.

In accordance with an embodiment of the present disclosure, a user terminal for a satellite communication system is provided. The satellite communication system includes a plurality of satellites and a plurality of gateway terminals. The user terminal is assigned to a ground network point-of-presence (POP) and includes an interface device configured for electronic communication with local user computing devices, a phased array antenna, at least one processor, and a computer-readable storage device storing instructions. The instructions are executable to cause the at least one processor to perform operations including one or more of: receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the POP; during a first of the time slots, commanding the phased array antenna to transmit a first one or more data requests to one of the candidate satellites identified for the first time slot; during the first time slot and subsequent to transmitting the first one or more data requests, detecting a deviation from a communication quality threshold on a communication path between the phased array antenna and the ground network POP; and during the first time slot and in response to detecting the deviation, commanding the phased array antenna to transmit a second one or more data requests to another of the candidate satellites identified for the first time slot.

In accordance with another embodiment of the present disclosure, a user terminal for a satellite communication system is provided. The satellite communication system includes a plurality of satellites and a plurality of gateway terminals. The user terminal is assigned to a ground network point-of-presence (POP) and includes an interface device configured for electronic communication with local user computing devices, a phased array antenna, at least one processor, and a computer-readable storage device storing instructions. The instructions are executable to cause the at least one processor to perform operations including one or more of: storing obstruction information in a memory of the user terminal, wherein the obstruction information identifies one or more obstructed lines of sight of the phased array antenna; receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the PoP; determining, based on the obstruction information and prior to a first of the time slots, that one of the candidate satellites identified for the first time slot will become obstructed for at least one portion of the first time slot; during portions of the first time slot other than the at least one portion, commanding the phased array antenna to transmit a first one or more data requests to the one of the candidate satellites identified for the first time slot; and during the at least one portion of the first time slot, commanding the phased array antenna to transmit a second one or more data requests to another of the candidate satellites identified for the first time slot.

In accordance with another embodiment of the present disclosure, a method for communications in a satellite communication system between a user terminal and a ground-based network is provided. The satellite communication system includes a plurality of satellites and a plurality of gateway terminals. The user terminal is assigned to a ground network point-of-presence (POP) and includes a phased array antenna, an interface device configured for electronic communication with local user computing devices, and at least one processor. The method can include one or more steps, performed by the at least one processor of the user terminal, of: receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the POP; during a first of the time slots, commanding the phased array antenna to transmit a first one or more data requests to one of the candidate satellites identified for the first time slot; during the first time slot and subsequent to transmitting the first one or more data requests, detecting a deviation from a communication quality threshold on a communication path between the phased array antenna and the ground network POP; and during the first time slot and in response to detecting the deviation, commanding the phased array antenna to transmit a second one or more data requests to another of the candidate satellites identified for the first time slot.

In accordance with another embodiment of the present disclosure, a method for communications in a satellite communication system between a user terminal and a ground-based network is provided. The satellite communication system includes a plurality of satellites and a plurality of gateway terminals. The user terminal is assigned to a ground network point-of-presence (POP) and includes a phased array antenna, an interface device configured for electronic communication with local user computing devices, and at least one processor. The method can include one or more steps, performed by the at least one processor of the user terminal, of: storing obstruction information in a memory of the user terminal, wherein the obstruction information identifies one or more obstructed lines of sight of the phased array antenna; receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the POP; determining, based on the obstruction information and prior to a first of the time slots, that one of the candidate satellites identified for the first time slot will become obstructed for at least one portion of the first time slot; during portions of the first time slot other than the at least one portion, commanding the phased array antenna to transmit a first one or more data requests to the one of the candidate satellites identified for the first time slot; and during the at least one portion of the first time slot, commanding the phased array antenna to transmit a second one or more data requests to another of the candidate satellites identified for the first time slot.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7A illustrates an example method in accordance with embodiments of the present disclosure;

FIG. 7B illustrates another example method in accordance with embodiments of the present disclosure.

DESCRIPTION OF EXAMPLE EMBODIMENTS

Figure 1A:
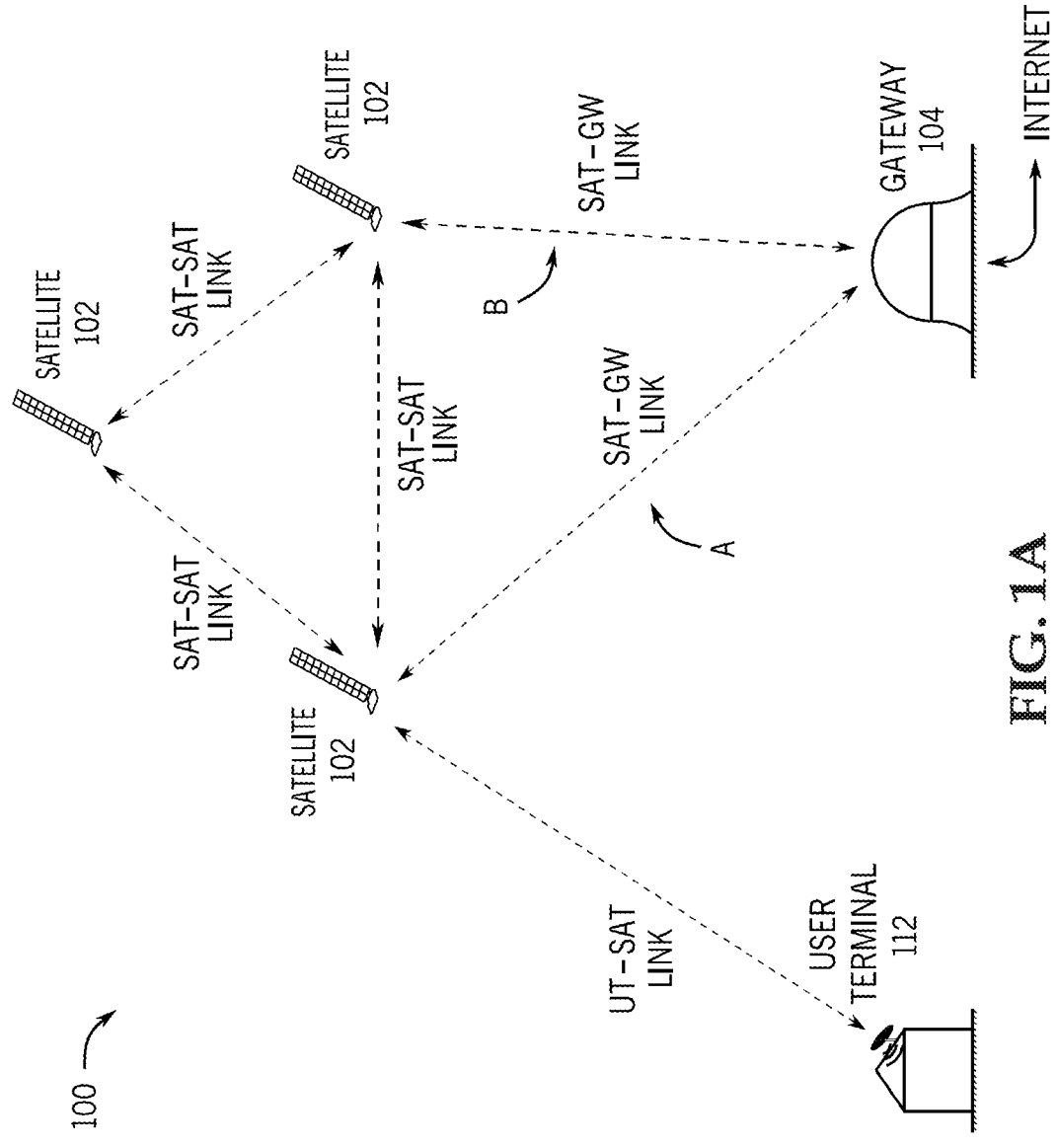
FIG. 1A illustrates a simplified schematic of an exemplary satellite communication system in accordance with embodiments of the present disclosure.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment. Such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Elements of a Satellite Communication System

Figure 1B:
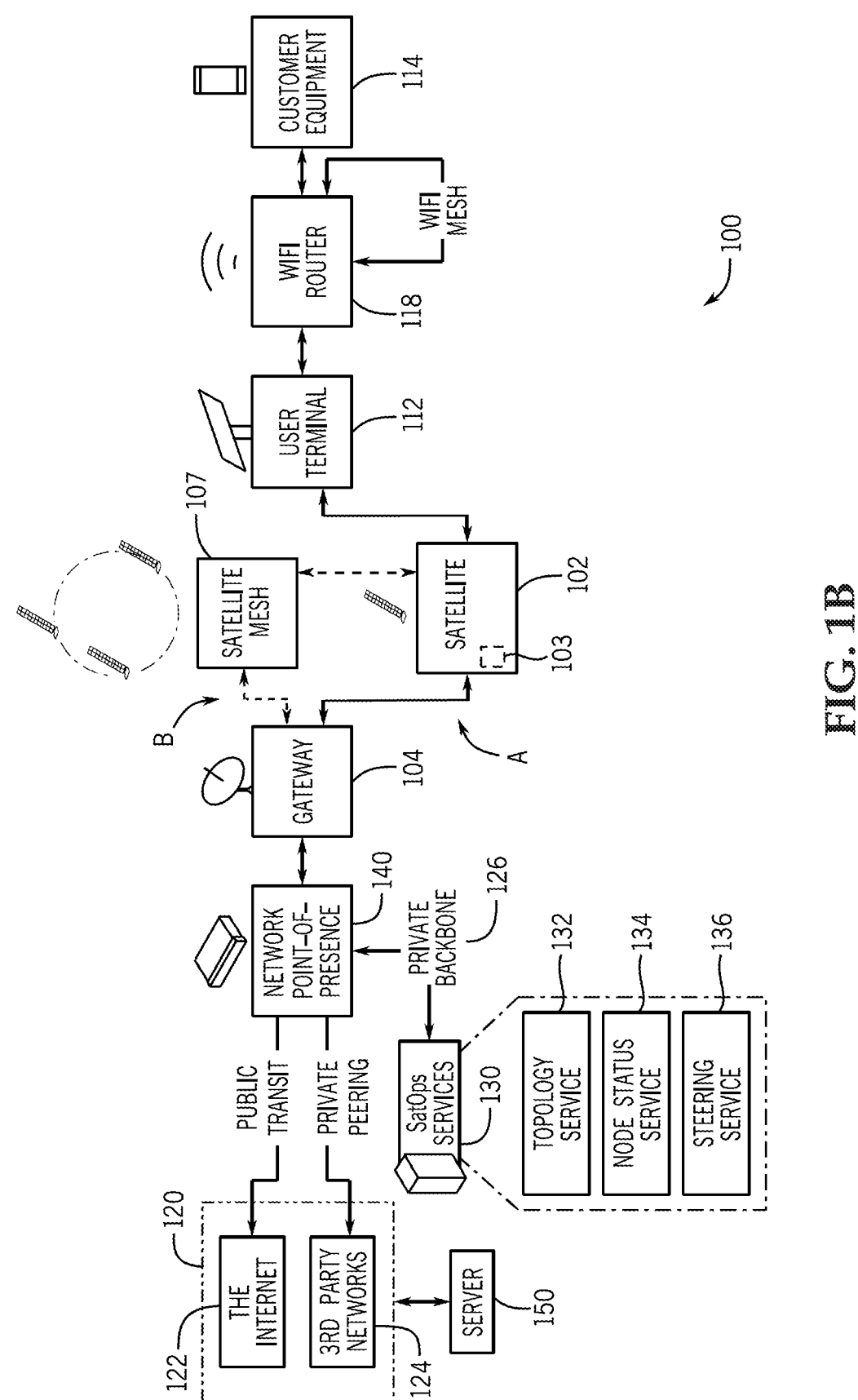
FIG. 1B illustrates a simplified block diagram of the satellite communication system of FIG. 1A in accordance with embodiments of the present disclosure.

FIG. 1A is a simplified schematic, and FIG. 1B is a simplified block diagram, of elements of an exemplary satellite communication system 100. The elements are capable of communication with each other via a mesh topology. The term "mesh topology" refers to the configuration of the elements as nodes in a mesh network. The various nodes in the mesh network coordinate with one another to efficiently route data in order to respond to requests for user data. As will be discussed in more detail herein, the configuration of the nodes in the mesh topology changes dynamically in satellite communication system 100 to account for factors such as the motion of the satellites 102 relative to the Earth's surface and, in some cases, relative motion among the satellites 102. For example, as part of the network mesh topology of the satellite communication system 100, certain satellites 102 may communicate directly with each other in a satellite mesh topology 107.

In addition to the satellites 102, the satellite communication system 100 also includes a user terminal 112 on Earth and a gateway terminal 104 on Earth. The user terminal 112 and the gateway terminal 104 may be referred to collectively as "ground terminals." Each satellite 102 includes an onboard satellite computer system 103 programmed to manage communications with user terminals 112, gateway terminals 104, and other satellites 102, using one or more communication terminals (e.g., RF antennas and/or laser communication terminals) of the satellite. In particular, the satellite computer system 103 routes communications to and from those nodes through the respective satellite 102 as part of the network mesh topology.

User terminal 112 may be installed at a house, a business, a vehicle (e.g., a land-, air-, or sea-based) vehicle, or another Earth-based location where a user desires to obtain communication access or Internet access via the satellites 102. An Earth-based user terminal 112 may be a mobile or non-mobile terminal connected to Earth or as a non-orbiting body positioned near Earth. For example, an Earth-based user terminal 112 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon, or a mobile object, such as an automobile or an airplane.

For example, the user may connect one or more network devices 114 such as desktop computers, laptops, mobile devices, Internet of Things (IoT)-enabled devices, and the like (collectively, "customer equipment") locally to the user's user terminal 112 and obtain access via satellites 102 to the Internet. Although the local connection between the customer equipment and the user terminal is illustrated as a WiFi router 118 (or more broadly a WiFi mesh), other types of wired or wireless local communication are also contemplated.

The gateway terminal 104 serves as a satellite access gateway for the satellite(s) 102 to communicate with one or more ground-based networks 120, such as the Internet 122 or another ground-based network 124. For example, the "other" type of ground-based network 124 may represent a limited access third-party network, such as but not limited to a cloud computing data center. The gateway terminal 104 may be connected to a point-of-presence (POP) 140 on the ground-based network 120. For example, a dedicated PoP 140 may be assigned to each gateway terminal 104, and may be physically wired to the gateway terminal 104. In some cases, multiple gateway terminals 104 at a same site can be connected to a same PoP 140. Additionally or alternatively, different gateway terminals 104 at a same site can be connected to different PoPs 140. The POP 140 may access data from the ground-based network 120 (e.g., from one or more servers 150) and provide the data back through the satellite communication system 100 to the user terminal 112 and network device 114.

The illustrated communication signal paths in the satellite communication system 100 include a link between the user terminal 112 and one of the satellites 102 in the mesh, which may be referred to as a UT-SAT link. In the exemplary embodiment, the UT-SAT link is implemented as a Ku-band radio frequency (RF) link. For example, the user terminal 112 and each of the satellites 102 may include a phased array antenna for transmitting and receiving RF signals in the Ku band. However, other types of communication links are also contemplated for implementing the UT-SAT link, for example, other bands or other types of links including optical links. Moreover, while only one user terminal 112 and three satellites 102 are illustrated, satellite communication system 100 may include millions of user terminals 112 and many thousands of satellites 102, and different ones of the user terminals 112 and satellites 102 may use different types of communication links to establish the UT-SAT link.

The illustrated communication signal paths in the satellite communication system 100 include a link between one of the satellites 102 in the mesh and the gateway terminal 104, which may be referred to as a SAT-GW link. In the exemplary embodiment, the SAT-GW link is implemented as a Ka-band radio frequency (RF) link. For example, the gateway terminal 104 and each of the satellites 102 may include a parabolic antenna for transmitting and receiving RF signals in the Ka band. However, other types of communication links are also contemplated for implementing the SAT-GW link. For example, the satellites 102 may also include laser communication terminals, as described below, and the gateway terminal 104 may also include one or more laser communication terminals for communication with the satellites 102 when atmospheric weather conditions are favorable for ground-to-space (and space-to-ground) laser transmission. It should be understood that the gateway terminals 104 can include multiple antennas in any combination of parabolic antennas, laser communication terminals, or other type of communication links. Moreover, while only one gateway terminal 104 and three satellites 102 are illustrated, satellite communication system 100 may include hundreds of gateway terminals 104 and many thousands of satellites 102, and different ones of the gateway terminals 104 and satellites 102 may use different types of communication links to establish the SAT-GW link.

The illustrated communication signal paths in the satellite communication system 100 may further include links between respective pairs of the satellites 102 in the satellite mesh topology 107, which may be referred to as SAT-SAT links. In the exemplary embodiment, the SAT-SAT links are implemented as optical frequency links, or simply "optical" or "laser-based" links. For example, each of the satellites 102 also includes one or more laser communication terminals for transmitting and receiving laser-based (e.g., optical) signals. The laser communication terminals may be dynamically oriented with respect to the satellite 102 on which they are mounted to enable the laser communication terminals of each satellite 102 to track, and maintain the SAT-SAT links 106 with, other satellites 102 in relative motion with respect to the satellite 102. In the exemplary embodiment, each of the satellites 102 includes multiple laser communication terminals that may be independently oriented to enable each satellite to simultaneously maintain SAT-SAT links with multiple other satellites 102. However, other types of communication links are also contemplated for implementing the SAT-SAT links. Moreover, while only three satellites 102 are illustrated, satellite communication system 100 may include many thousands of satellites 102, and different pairs of the satellites 102 may use different types of communication links to establish the respective SAT-SAT link between them. Additionally, one or more of the satellites 102 may not be configured to establish SAT-SAT links with other satellites 102.

In some instances, communications between the user terminal 112 and the ground-based network 120 may be routed through a particular satellite 102 via a UT-SAT link, and through that same satellite directly to and from the gateway terminal 104 via a SAT-GW link, as shown in path A, without being routed through any other satellites 102. In other words, in some instances it is not necessary for the satellite 102 to utilize or maintain SAT-SAT links with other satellites, or even to be capable of establishing SAT-SAT links with other satellites, for the satellite communication system 100 to route communications between the user terminal 112 and the gateway terminal 104. In other instances, communications between the ground-based network 120 and the user terminal 112 having a UT-SAT link with the particular satellite 102 may be routed through a different satellite 102 that has established a SAT-GW link with the gateway terminal 104, as shown in path B, using one or more SAT-SAT links between the satellites 102 in the satellite mesh topology 107.

In the exemplary embodiment, satellite communication system 100 also includes satellite operations ("SatOps") services 130 connected to the gateway terminal 104 from a centralized location. In the exemplary embodiment, each gateway terminal 104 is associated with a corresponding PoP 140, and the POP 140 is connected to the centralized SatOps services 130 via a private backbone 126. The SatOps services 130 may transmit various operational and management instructions to the gateway terminal 104, as well as to the satellites 102 (via the gateway terminal) and to the user terminal 112 (via the gateway terminal and the satellites). In the exemplary embodiment, the private backbone 126 may be implemented on an Internet-based secure cloud platform, such as Microsoft Azure® or Amazon Web Services® (AWS) by way of non-limiting examples. However, other implementations of the private backbone 126 are also contemplated.

Satellite Constellation

For global coverage having reduced latency, satellite communication system 100 employs non-geostationary satellites, and more specifically low-Earth orbit (LEO) satellites 102. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, LEO satellites orbit at a much lower altitude (typically less than about 2,000 km above mean sea level), which reduces Earth-satellite signal travel time and therefore reduces communication latency relative to GEO satellites.

However, a stable low-Earth orbit necessarily corresponds to a much shorter orbital period as compared to GEO satellites. For example, at a particular altitude, a LEO satellite 102 may orbit the Earth, for example, once every 95 minutes. Further in the exemplary embodiment, the low-Earth orbits of satellites 102 are prograde. Therefore, LEO satellites do not remain stationary relative to a specific location on Earth, but rather advance generally eastward with respect to the Earth's surface. In addition, the lower orbital altitude means that, as compared to a GEO satellite, a LEO satellite has a more limited line of sight. For example, a LEO satellite in an equatorial orbit would not have a "line of sight" for direct communication with user terminals or gateway terminals at middle or upper latitudes on Earth, such as at locations L1 (corresponding to Los Angeles, California) and L2 (corresponding to Seattle, Washington) identified in FIG. 2.

Figure 2:
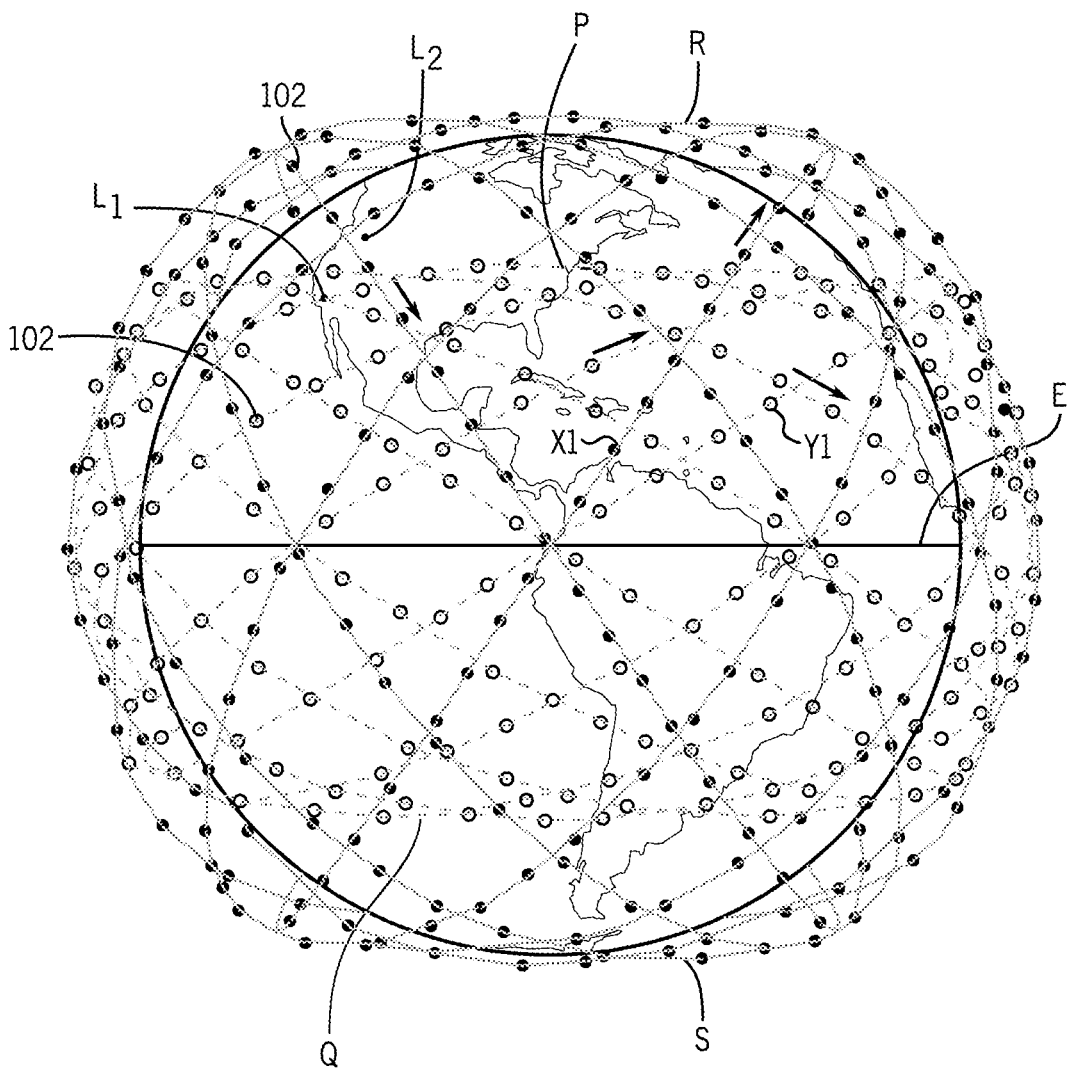
FIG. 2 is a schematic showing exemplary planar orbital patterns of a group of satellites, which may be used in the satellite communication system of FIG. 1A, around a rotating Earth in accordance with embodiments of the present disclosure.

Accordingly, satellite communication system 100 may include a large number, for example several thousand, satellites 102 arranged in a constellation of inclined orbits that ensures that at least some satellites 102 are always crossing the sky within range of user terminals 112 at any given Earth latitude and longitude. One non-limiting embodiment is illustrated in FIG. 2, which is a schematic showing an example of satellite planar orbital patterns X1 and Y1 of satellites 102 around a rotating Earth. In FIG. 2, the satellites in pattern X1 are represented by closed circles, and the satellites in pattern Y1 are represented by open circles, with arrows illustrating a general direction of travel of the satellites in each string. Each satellite string may include a number of equally spaced or substantially equally spaced satellites 102. More specifically, in a frame that rotates with the Earth, satellites 102 in the first string X1 are in discrete orbits sharing a first inclination, and satellites 102 in the second string Y1 are in discrete orbits sharing a second inclination different from the first inclination.

The angle of inclination of the satellites typically corresponds to an upper and lower limiting Earth latitude (indicated as P and Q for satellite string X1, and as R and S for satellite string Y1) of the orbital paths of the satellites. Although two strings at different inclinations are illustrated, other numbers of strings, such as one string or more than two strings, are also contemplated. Moreover, the illustrated angles of inclination are examples, and other angles of inclination for a single string or for multiple strings are also contemplated. Orbital patterns X1 and/or Y1 may be designed as repeating ground track systems, or may have a drifting pattern relative to the Earth's rotation rate.

Due to the inclination of the orbits, in addition to the general eastward motion of the satellites relative to the Earth's surface, each satellite 102 spends half its orbital period ascending from south to north over the Earth's surface, and the other half of its orbital period descending from north to south.

Ground Terminal Mesh Topology

Figure 3:
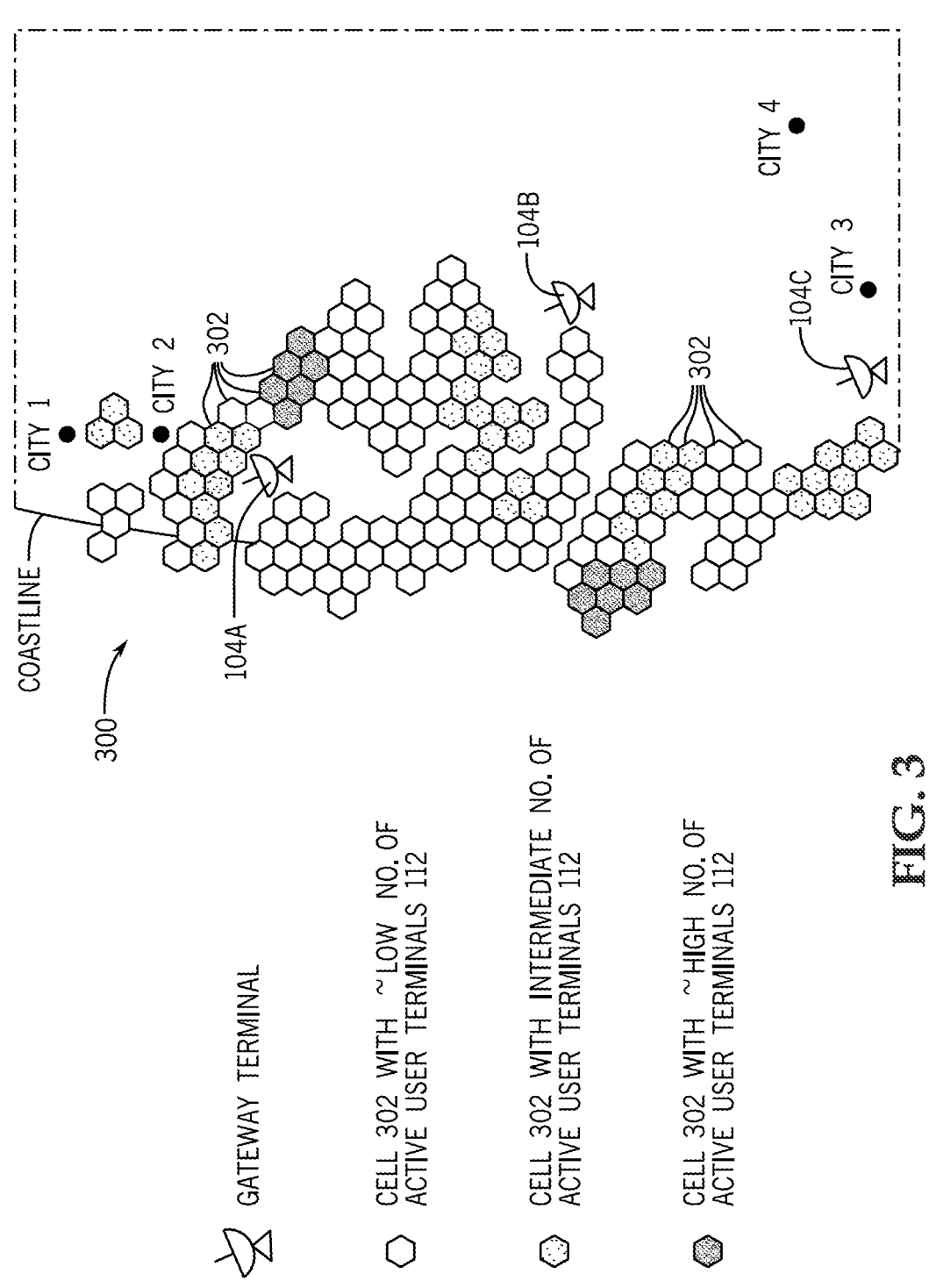
FIG. 3 illustrates a not-to-scale aerial view of an exemplary ground area that may be serviced by the satellite communication system of FIG. 1A, including user terminals grouped into service cells, and gateway terminals.
Figure 4:
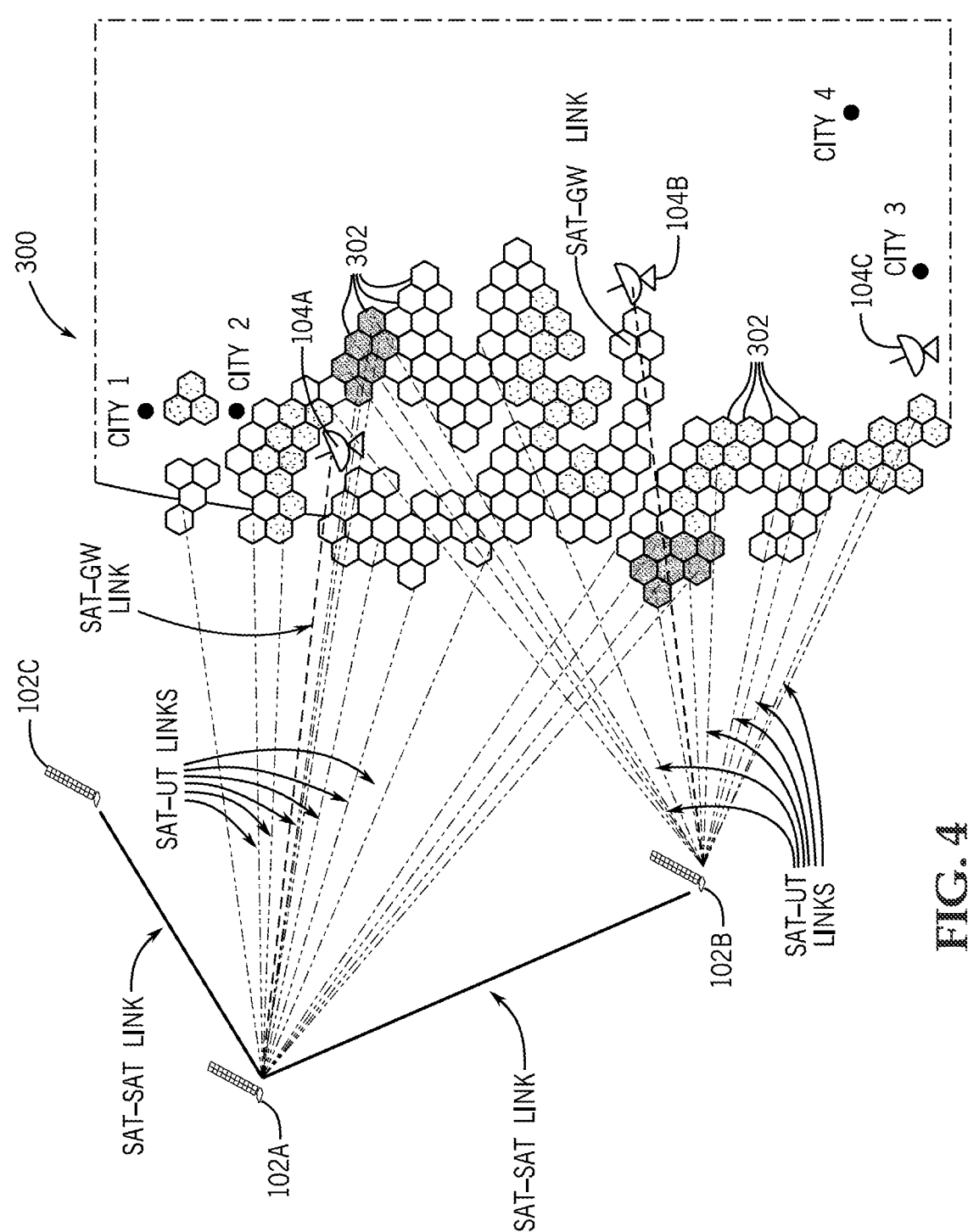
FIG. 4 illustrates a not-to-scale aerial view of the ground area shown in FIG. 3 being serviced by certain exemplary satellites of the group in communication with the user terminals and the gateway terminals.

FIG. 3 illustrates a not-to-scale aerial view of an exemplary ground area 300 that may be serviced by the satellite communication system 100. More specifically, the ground area 300 includes a number of user terminals 112 that may transmit requests for user data to be serviced ultimately by, e.g., server 150 (shown in FIG. 1B) or other data sources. The requests for user data, and the data responsive to the requests, may be routed to and from the user terminals via the network topology of the satellite communication system 100. FIG. 4 illustrates a not-to-scale aerial view of requests from, and responses to, ground area 300 being serviced by example satellites 102A, 102B, and 102C of the group of satellites 102 in communication with example gateway terminals 104A, 104B, and 104C.

The network topology of the satellite communication system 100 may be analogized to a map of roads (travel routes) interconnecting a group of cities (nodes). For road travel between two cities separated by a significant distance, several different road routes may be available, each using roads that connect a different set of intermediate cities. One must know which intermediate cities are connected by roads, and how much traffic there will be on each road, in order to select the best travel route between the two cities.

Similarly, for data travel between two nodes in the satellite communication system 100 (e.g., between a user terminal 112 and a data source, such as the ground-based server 150 (shown in FIG. 1)), several different network routes may be available, each using links that connect a different set of intermediate nodes (i.e., satellites and gateways). One must know which satellites are within the field of view of the user terminal, which satellites and gateways are connected by data links, and how much traffic there will be on each link, in order to select the best data route between the user terminal and the data source. The topology of the satellite communication network 100 is more complex than a road map, however, because the "roads" (data communication routing through the mesh topology) must be frequently reconfigured to accommodate the relative motion of the satellites 102 with respect to the ground terminals 112 and 104, and in some cases with respect to each other. In some embodiments, the reconfiguration must occur once or more per minute to accommodate the relative motion of the satellites 102.

In the exemplary embodiment, the ground area 300 includes user terminals 112 grouped into service cells 302 that are geographically fixed relative to the Earth. Although each service cell 302 is illustrated as a hexagonally shaped area, service cells 302 of any shape are contemplated. Moreover, although the service cells 302 are illustrated as having a particular size, other sizes of service cells 302 are contemplated. Service cell size may be a function of multiple factors including, but not limited to, altitude of the satellite constellation, number of satellites in the satellite constellation, number of Earth-based users, geography, etc. The ground area 300 also includes one or more gateway terminals 104.

In some embodiments, the user terminals 112 in each service cell 302 are further grouped into different network traffic "lanes" within the service cell 302. The lanes may be, but need not be, associated with particular geographical subregions within the service cell 302. Each combination of a service cell 302 and lane may be uniquely identified in the network addressing scheme utilized by the satellite communication system 100, such that all user terminals 112 in a specific service cell and lane can be addressed as a group. For example, if the network addressing scheme is structured similar to Internet Protocol (IP) addressing, each service cell and lane may be associated with a unique network address prefix.

In some embodiments, each user terminal 112 is configured to address requests for user data to a particular PoP 140 (shown in FIG. 1B), which may be referred to as the "home" PoP 140 for the user terminal. In some embodiments, the user terminals 112 are assigned to a "home" PoP 140 on a per-service cell or per-lane basis. The home POP 140 may be assigned based on a physical proximity of the service cell to the home PoP 140. The approach of assigning home PoPs based on geographic proximity tends to reduce a signal travel time through the satellite communication system 100 for the requests for user data. However, other methods of assigning a "home" PoP 140 to each user terminal for the addressing of requests for user data are also contemplated. The home PoP 140 handles each request for user data by accessing resources on the ground-based network 120 to obtain the requested data, and by accessing the SatOps services 130 to obtain routing instructions for returning the requested data.

With reference to FIGS. 1-4, as a result of the motion of satellites 102 relative to the Earth's surface, a particular satellite 102 may be in a position to establish communication with the user terminals 112 in a particular service cell 302 for only a limited time window, such as less than ninety minutes, less than sixty minutes, less than thirty minutes, less than fifteen minutes, less than five minutes, or less than one minute. In the exemplary embodiment, the SatOps services 130 include a topology service 132 that assigns, to each service cell 302 (and in some embodiments to each lane within the service cell), one or more of the satellites 102 to be available for linking with the user terminals 112 on a slot-by-slot basis, in which each slot represents a period of time. The period of time, i.e., time slot length, may be selected to accommodate the limited time windows over which any particular satellite may be within the field of view of the user terminals in that service cell. Time slot length may be a function of orbital velocity of the satellite constellation (which in turn may be a function of altitude of satellite constellation), number of satellites in the satellite constellation, size of the service cells, etc. In the exemplary embodiment, the time slot length is between 10 and 20 seconds inclusive. For example, each time slot may be 15 seconds long. However, other time slot lengths are also contemplated.

The topology service 132 may transmit topology schedule data to the user terminals 112 in each service cell 302 on a regular basis (e.g., via the gateway terminal 104 and the satellite 102 that are currently in communication with the service cell 302 associated with the respective user terminal 112). The topology schedule data transmitted to the user terminals specifies one or more of the satellites 102 that will be available for connectivity to the respective user terminal 112 during one or more future time slots. The topology schedule data may also include pointing instructions for the phased array antenna of the user terminal (or for the appropriate antenna for other types of UT-SAT links) needed to establish and maintain the corresponding UT-SAT link during the time slot, as derived from data provided by the node status service 134 for the relative motion of the satellite and the user terminal. In conjunction with the arrival of the future time slot, the user terminal 112 initiates a SAT-UT link with one of the satellites 102 specified by the topology schedule data for that time slot. In the exemplary embodiment, the SatOps services 130 also includes a steering service 136 that is programmed to manage the routing of the many data requests from, and responses to, user terminals 112 through the network topology of the satellite communication system 100.

The timing of the regular transmission of the topology schedule data to the user terminals may be selected to balance several factors. For example, transmitting the topology schedule data for each time slot well in advance of the arrival of the future time slot helps to ensure that the topology schedule data propagates through the gateways and satellites to the user terminals in time to enable the user terminals to re-orient their respective phased array RF beams when the future time slot arrives. On the other hand, transmitting the topology schedule data for each time slot a relatively short time in advance of the arrival of the future time slot enables the topology service 132 to account for more up-to-date satellite and gateway statuses and ground demand data in assigning service cells to satellites. For example, the SatOps services 130 may include a node status service 134 that monitors the satellites 102 and gateways 104. The node status service may provide projected satellite orbital positions during future time slots based on the position, velocity, and altitude of each satellite. The node status service may also provide data indicating Internet connectivity and performance of the POP 140 associated with each gateway terminal 104, and/or data indicating weather-based signal attenuation prediction data for each gateway site. The node status service 134 may further evaluate the health and operability of each satellite and gateway, for example, by tracking a slew rate and alignment performance of each parabolic antenna of the satellite or gateway to determine a current capability of the parabolic antenna to establish and track links. Other types of health and/or status monitoring of the nodes in satellite communication system 100 are also contemplated. The topology service 132 may be programmed to avoid assigning a potential link between nodes if the node status data suggests the link would be unreliable. Additionally or alternatively, the topology service 132 may be programmed to assign a reliability label to a link between nodes if some node status data suggests the link would be unreliable during one or more time slots, and to include the reliability label in data provided to the steering service 136, so that the steering service 136 can take the potential unreliability of the link into account for data routing decisions during the one or more time slots.

In some embodiments, the factors involved in advance transmission timing for the topology schedule data may be balanced advantageously by regularly transmitting the topology schedule data to the user terminals in each service cell at an advance transmission time of five to ten minutes in advance of the one or more future time slots associated with the topology schedule data. However, other advance transmission times are also contemplated.

As discussed above with respect to user terminals, a particular satellite 102 also may be in a position to establish communication with a particular gateway terminal 104 for only a limited time window. In the exemplary embodiment, the topology service 132 also assigns each satellite 102 to one of the gateway terminals 104 on the slot-by-slot basis. The topology service 132 may transmit topology schedule data to the gateway terminals and to the satellites on a regular basis (e.g., via the gateway terminal 104 that is currently in communication with the respective satellite 102). The topology schedule data specifies an expected connectivity between each gateway terminal 104 and one or more satellites 102 during one or more future time slots. The topology schedule data transmitted to each satellite 102 may also include pointing instructions for the parabolic RF antenna of the satellite (or for the appropriate antenna for other types of SAT-GW links), and likewise the topology schedule data transmitted to each gateway terminal 104 may also include pointing instructions for the parabolic RF antenna of the gateway terminal (or for the appropriate antenna for other types of SAT-GW links), needed to establish and maintain the corresponding SAT-GW link during the time slot, as derived from data provided by the node status service 134 for the relative motion of the satellite and the gateway terminal. In conjunction with the arrival of the future time slot, the satellite 102 initiates a SAT-GW link with the gateway terminal 104 specified by the topology schedule data for that time slot.

The timing of the advance transmission may be based on advance timing factors similar to those discussed above. For example, the satellites and gateways terminals may need to receive the topology schedule data sufficiently in advance of the future time slot to calculate and execute slewing of their respective parabolic RF antennas as required by the topology schedule data for that future time slot. In some embodiments, the advance transmission time for the topology schedule data to the satellites and the gateway terminals is five to ten minutes in advance of the one or more future time slots associated with the topology schedule data. However, other advance transmission times are also contemplated.

For example, as illustrated in FIG. 4, three satellites 102A, 102B, and 102C are approaching ground area 300 at the start of a particular time slot. The service cells 302 in the ground area have varying numbers of active user terminals 112. The user terminals 112 in each service cell 302 have previously received topology schedule data for the particular time slot, specifying satellites 102A, 102B, and 102C as being available for UT-SAT links during the particular time slot. Accordingly, in conjunction with the arrival of the time slot, the various user terminals 112 in ground area 300 establish respective links with satellite 102A, 102B, or 102C for communication with satellite communication system 100.

In some embodiments, the topology schedule data specifies, on a per service cell 302 basis, a priority sequence in which the user terminals 112 should attempt to establish links with the available satellites 102A, 102B, and 102C. In other words, the topology schedule data sent to user terminals in some service cells may specify a priority of 102A, 102B, and 102C for attempts to establish links during the time slot, while the topology schedule data sent to user terminals in other service cells may specify a priority of 102B, 102A, and 102C for attempts to establish links during the time slot. Each user terminal 112 attempts first to establish a UT-SAT link with the first satellite in the priority sequence, and if unsuccessful, attempts to establish a UT-SAT link with the second satellite in the priority sequence, and so on. Although three satellites are listed in the example priority sequences above, other numbers of satellites in a priority sequence are also contemplated, and different service cells may be given different numbers of satellites in their priority sequences. In other embodiments, the topology schedule data merely identifies, on a per service cell 302 basis, a non-prioritized list of satellites that should be available to establish links, and each user terminal 112 is programmed to select for itself an order in which the user terminal will attempt to establish a link with each of the listed satellites. For example, the UT computer system 113 may be programmed to apply an algorithm to the list of candidate satellites to select a particular satellite for attempting to establish a UT-SAT link. The algorithm may include a random element, and/or may rely on information stored locally by the UT computer system 113, such as, but not limited to, a locally stored obstruction map (discussed below).

In addition, in certain embodiments, a combination approach may be used. For example, the topology schedule data may identify a higher priority tier of multiple candidate satellites from among which the user terminal 112 can select first using its own local algorithm, and also a lower or de-prioritized tier of candidate satellites. The algorithm used by the UT computer system 113 may be programmed to select one of the de-prioritized satellites only if the user terminal does not establish a satisfactory connection with any of the satellites in the higher priority tier.

In some embodiments, as described above, each service cell may be associated with one or more "lanes" of network traffic. The lanes may be characterized as virtual pathways defined by the network addressing scheme of the satellite communication system 100, and the lane addresses may stay constant as the satellites physically serving the user terminals in the service cell change over time. In certain embodiments, data traffic on each lane of the service cell is assigned on a slot-by-slot basis to be physically carried by one of the satellites listed in the topology schedule data provided to the user terminals in the service cell. For example, a particular service cell 302 may have multiple lanes of network traffic defined in the network addressing scheme of the satellite communication system 100, and the number (and network identification) of the lanes may be maintained independently of any variation in the number of satellites listed in the topology schedule data for each time slot. As an illustration, a service cell may have three lanes of network traffic defined. If three satellites 102 are listed in the topology schedule data for that service cell in a first time slot, each of those three satellites may be assigned to physically carry the data traffic for a different one of the three lanes during the first time slot.

If fewer than three satellites 102 are listed in the topology schedule data for that service cell in a second time slot, data traffic on at least two of the lanes is assigned to be carried by the same satellite during the second time slot.

Because the user terminal 112 may independently determine which satellite to establish a UT-SAT link with, the SatOps services 130 does not know in advance which satellite 102 will be in communication with which user terminal 112. In some embodiments, each time a user terminal 112 successfully establishes a new UT-SAT link with one of the satellites 102, the SatOps services 130 associates, in a memory, the user terminal with the lane of network traffic corresponding to the current linked satellite. The SatOps services 130 provides that association as part of the network data to the steering service 136, to enable data routing through the proper current network lane back to the user terminal.

There may be several advantages in providing the user terminals 112 in each service cell 302 with more than one candidate satellite 102 for establishing a UT-SAT link during a given time slot. For example, for a service cell 302 that receives topology schedule data including a list of candidate satellites 102A, 102B, and 102C, some user terminals in that service cell may become blocked from communication with satellite 102A, as the satellite moves across the sky relative to the ground, by a local obstacle, such as a tree or building. The list of candidates in the topology schedule data enables the user terminal to quickly move to establish a link with the next candidate satellite during the same time slot. In addition, there may be an upper limit on the number of UT-SAT links that can be maintained by each satellite 102A, 102B, and 102C. For example, each satellite 102 may have a finite number of phased array antennas configured to receive a signal within an associated bandwidth, the bandwidth of each phased array antenna may be distributed among a finite number of signal channels, and the satellite 102 may be configured to decode a finite number of beams (e.g., beams from user terminals 112) within each signal channel. In some examples, the satellites 102 may each have from one to four receiving phased array antennas, each receiving phased array antenna may have from 4 to 24 channels, and the satellite may be configured to decode from 4 to 32 beams per channel. More or fewer beams per antenna, or more or fewer antennas per satellite, are also contemplated. Accordingly, some user terminals 112 in a service cell 302 with a relatively high number of active user terminals may be blocked from linking to one or more of the candidate satellites in the topology schedule data for a given time slot, because a number of other user terminals equal to the overall beam decoding capacity of the candidate receiving satellite have already established communications with the candidate receiving satellite. Again, the list of candidate satellites in the topology schedule data enables the blocked user terminal to quickly move to establish a link with the next candidate satellite during the same time slot. For these or similar reasons, even in embodiments where all user terminals in the same service cell 302 receive the same priority list of satellites for a particular time slot, user terminals in that service cell may switch lanes to establish UT-SAT links with different satellites during that time slot.

Similarly, the satellites 102A, 102B, and 102C have previously received topology schedule data for the particular time slot shown in FIGS. 3 and 4. The topology schedule data can specify, for each satellite, one of the gateway terminals 104A, 104B, and 104C for SAT-GW links during the particular time slot. Accordingly, in conjunction with the arrival of the time slot, the various satellites 102 establish respective SAT-GW links with gateway terminals 104A, 104B, and 104C for communication with satellite communication system 100.

Satellite Mesh Topology

The term "satellite mesh topology" refers specifically to the network interconnectivity among the group of satellites 102 as nodes within the overall mesh network, and the configuration of the satellite mesh topology 107 changes dynamically over time in the satellite communication system 100 to account for relative motion among the satellites 102 and other factors.

One factor that affects the satellite mesh topology 107 is that each satellite 102 can only link directly to a limited number of other satellites 102 at any given time, due to each satellite 102 having a finite number of laser communication terminals (and/or other SAT-SAT communication devices). In other words, at any given time, each satellite 102 is capable of establishing a direct network connection to only a few other satellites 102 out of potentially thousands of satellites in the constellation. In one embodiment, each satellite 102 has five laser communication terminals available to link to other satellites 102. However, embodiments in which one or more of the satellites 102 has a different number of laser communication terminals (or a different number of other SAT-SAT communication devices) are also contemplated.

In the exemplary embodiment, the topology service 132 assigns SAT-SAT links among pairs of satellites 102 on the slot-by-slot basis. The topology service 132 may include the link assignments in the topology schedule data transmitted to each satellite 102 on the regular basis, as discussed above (e.g., via the gateway terminal 104 currently in communication with the respective satellite 102). More specifically, the topology schedule data may specify a connectivity of the respective satellite 102 to other satellites in the satellite mesh topology 107 during the one or more future time slots. The topology schedule data may also include pointing instructions for each of the satellite's laser communication terminals (or for the appropriate antenna for other types of SAT-SAT links) needed to establish and maintain the specified SAT-SAT links during the time slot, as derived from data provided by the node status service 134 for the relative motion of the pair of satellites. In conjunction with the arrival of the future time slot, the satellite computer system 103 dynamically establishes SAT-SAT links with the other satellites specified by the topology schedule data for that time slot, as well as the SAT-GW link with the gateway terminal 104 specified for that time slot.

As noted above, the topology service 132 may be programmed to transmit the SAT-SAT link topology schedule data to the satellites on the same regular basis, such as five to ten minutes in advance of the one or more future time slots, as is used to transmit general mesh topology schedule data to the nodes. However, other advance transmission times are also contemplated.

Topology for Multiple Independent Network Paths Through the Satellite Communication System In some embodiments, the satellite communication system 100 may provide multiple independent network paths between the user terminals 112 in each service cell 302 and the ground-based network 120. For example, the algorithm used by the topology service 132 to assign satellites 102 to gateway terminals 104 may include a constraint that, for each time slot, at least two of the satellites 102 available for UT-SAT links to user terminals 112 in a particular service cell 302 must be assigned to different gateway terminals 104. The topology service 132 may then designate, in the topology schedule data transmitted to the user terminals 112 in that service cell 302, the at least two satellites as the satellites available for connectivity during the corresponding time slot. In this way, at least two independent network paths through the satellite communication system 100 are available to the user terminals 112 during each time slot. The provision of at least two independent network paths enables the user terminals, in response to a network event arising at any of the components in a first network path that results in a loss of communication with the ground-based server, to autonomously switch in real-time to a second network path that is independent of the network event in order to maintain communication with the ground-based network 120.

Figure 5A:
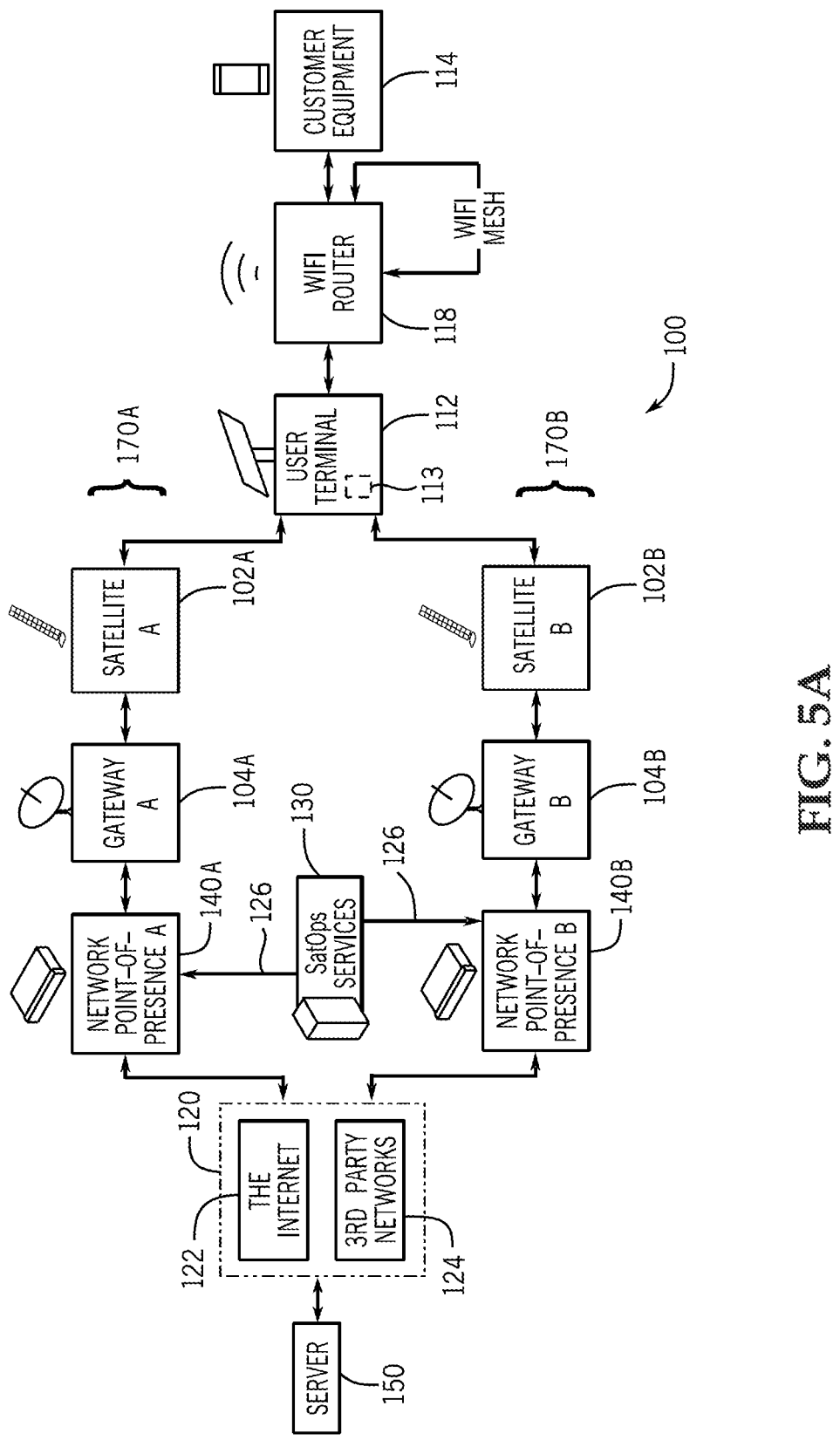
FIG. 5A illustrates a simplified block diagram of multiple independent network paths between a user terminal and a ground-based network through the satellite communication system of FIG. 1A in accordance with embodiments of the present disclosure.
Figure 5B:
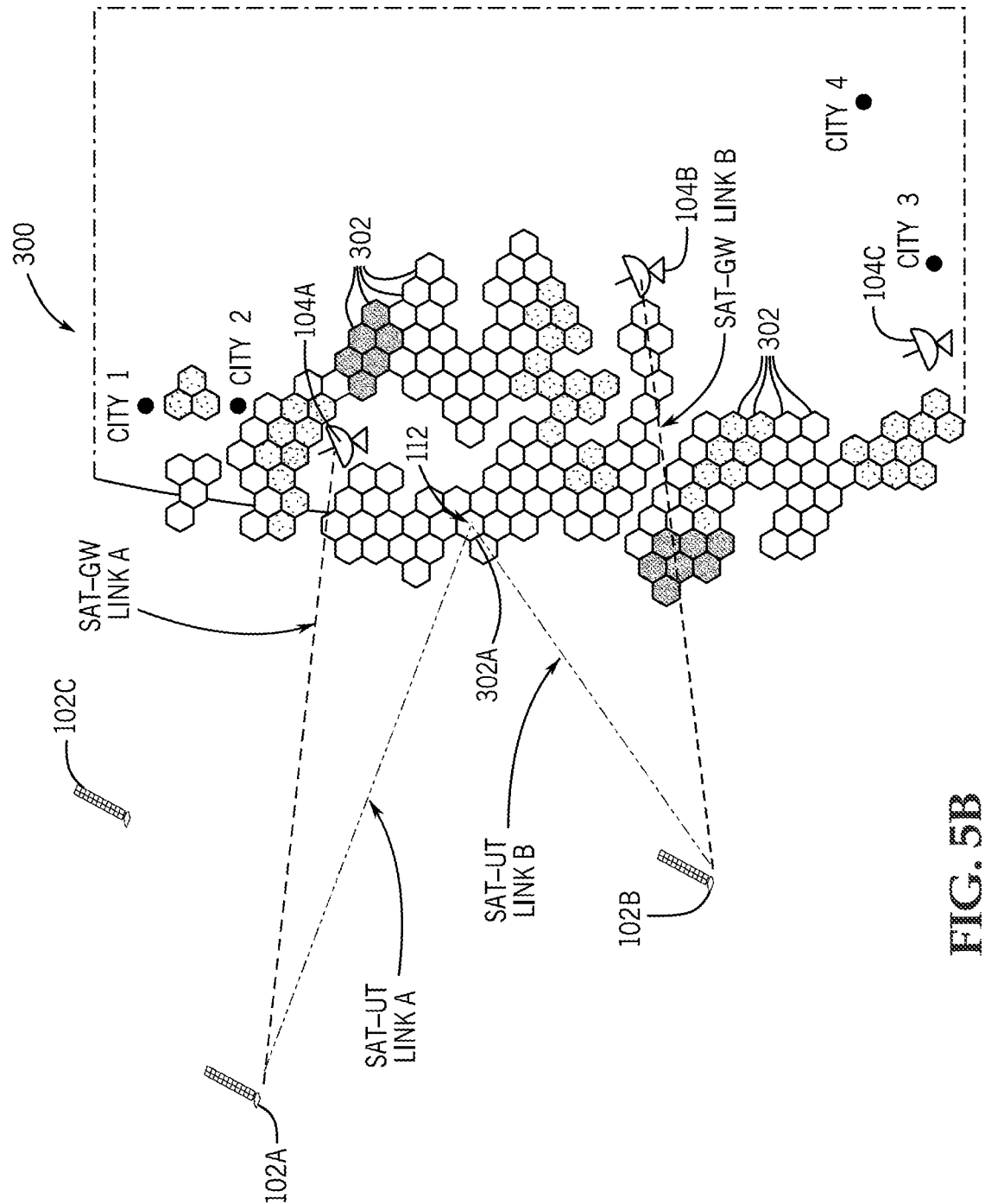
FIG. 5B illustrates a not-to-scale aerial view of a user terminal, located in one of the cells of the ground area shown in FIG. 3, being serviced via the multiple independent network paths shown in FIG. 5A in accordance with embodiments of the present disclosure.

FIGS. 5A and 5B illustrate an example for an example service cell 302A in the example ground area 300. The example ground area 300 includes three gateway terminals 104A, 104B, and 104C available to establish SAT-GW links with the satellites 102 passing over the ground area 300 during each time slot. As illustrated in FIG. 5B, three satellites 102A, 102B, and 102C are in view of the service cells 302 in the ground area 300 during a particular time slot. Accordingly, the topology service 132 may distribute the various network-defined lanes for the service cells 302 among the satellites 102A, 102B, and 102C during that time slot. The multiple-independent-path constraint causes the topology service 132 to assign at least satellite 102A and satellite 102B to carry network traffic for separate lanes of the service cell 302A for the particular time slot.

It may be the case that any one of the gateway terminals 104A-C, by itself, has sufficient bandwidth to establish SAT-GW links with all of the satellites 102A, 102B, and 102C during the time slot. However, the multiple-independent-path constraint also causes the topology service 132 to assign satellite 102A and satellite 102B to different gateway terminals 104A and 104B, respectively, for the particular time slot. As noted above, each gateway terminal 104 is assigned to at least one PoP 140 to service the antennas located at that gateway terminal installation. Thus, for example, each of the gateway terminals 104A and 104B can have access to the ground-based network 120 via a respective independent PoP 140A and 140B. Additionally, as noted above, gateway terminals located at the site of gateway terminal 104A can share the same PoP 140A or be connected to different PoPs, and gateway terminals located at the site of gateway terminal 104B can share the same PoP 140B or be connected to different PoPs. It is also contemplated that gateway terminals 104 at different sites can share a same PoP 140.

While the user terminal 112 is connected to satellite 102A, the data flow path 170A to the user's assigned home PoP 140A may be direct from satellite 102A to the gateway terminal 104A via a SAT-GW link, or may be indirect via one or more SAT-SAT links with other satellites in the satellite mesh topography 107 (shown in FIG. 1B), and then through a SAT-GW link from the final mesh satellite 102 to the gateway terminal 104A. Likewise, while the user terminal 112 is connected to satellite 102B, the data flow path 170B to the user's assigned home POP 140A may be direct from satellite 102B to the gateway terminal 104B via a SAT-GW link, or may be indirect via one or more SAT-SAT links with other satellites in the satellite mesh topography 107, and then through a SAT-GW link from the final mesh satellite 102 to the gateway terminal 104B. If one or both of the paths 170A and 170B utilizes the satellite mesh topology, the topology service 132 arranges the SAT-SAT links such that no satellites 102 in either path are common to both paths during any time slot. In other words, the topology service

132 ensures that network paths 170A and 170B are independent in cases where one or both paths is routed using SAT-SAT links in the satellite mesh topology 107. If the gateway terminal 104B is associated with (for example, directly connected via a ground fiber cable to) a different PoP 140B, the request for user data can be routed through the private backbone 126 to the home POP 140A. However, in some cases the algorithm used by the topology service 132 is configured to select, if possible, a gateway terminal (other than gateway terminal 104A) that is also associated with the home PoP 140A for use in path 170B, such that routing through a different POP 140B and the private backbone can be avoided.

In addition, the multiple independent path constraint causes the topology service 132 to list, in the topology schedule data transmitted to the user terminals 112 in the service cell 302 for the particular time slot, satellites 102A and 102B as candidate satellites or lanes for UT-SAT links. Accordingly, user terminals 112 in the service cell 302A have two lanes, provided by different satellites 102, from which to select for connection to the satellite communication system 100, and the two lanes lead to respective independent network paths, designated 170A and 170B, for connecting to the ground-based network 120 during the particular time slot. The user terminals 112 in the service cell 302A may each include a user terminal (UT) computer system 113 programmed to select between the list of satellites identified in the received topology schedule data for each time slot.

More specifically, the network path 170A includes the satellite 102A, the gateway terminal 104A, and, optionally, one or more additional satellites 102 in the satellite mesh topology 107. Network path 170B includes the satellite 102B, the gateway terminal 104B, and, optionally, one or more additional satellites 102 in the satellite mesh topology 107. The topology service 132 is programmed to ensure that these two paths share no gateway terminals 104 and no satellites 102 of the satellite communication system 100.

At the beginning of the time slot, the UT computer system 113 may cause a representative user terminal 112 in the service cell 302A to initially route communications, such as one or more data requests to the ground-based server 150, via a UT-SAT link with satellite 102A, thereby establishing connectivity with the ground-based network 120 via the first network path 170A. If the UT computer system 113 subsequently detects a deviation from a communication quality threshold, the UT computer system may cause the user terminal 112 to instead route subsequent communications, such as a second one or more data requests to the ground-based server 150, via a UT-SAT link with satellite 102B, thereby establishing connectivity with the ground-based network 120 via the second network path 170B. Advantageously, because of the initial provisioning of satellites 102A and 102B to different gateway terminals, the selection of a different satellite by the user terminal results in a different network path through satellite communication system 100 to the ground-based network 120. In other words, the switch to satellite 102B by the user terminal inherently avoids the node or component of the satellite communication system 100 that caused the delay during the connection to satellite 102A, regardless of whether the component was on the satellite 102A, the gateway terminal 104A, or one of the satellites in the satellite mesh topology 107 (if used) between satellite 102A and the gateway terminal 104A, because the route from satellite 102B to the home PoP 140 (that is, the entry point to the ground-based network 120) is independent of all of those components.

In some examples, the algorithm used by the topology service 132 may also cause the topology service 132 to assign satellite 102C to gateway terminal 104A during the particular time slot. For example, of all gateway terminals 104 within stable communication range of satellite 102C during the particular time slot, the topology service 132 may determine that gateway terminal 104A is best situated to handle the bandwidth demands of satellite 102C. In such cases, the multiple-independent-path constraint may cause the topology service 132 to omit satellite 102C from the list of candidate satellites in the topology schedule data transmitted to the user terminals 112 in the service cell 302A for the particular time slot, due to a non-independent network path relative to satellite 102A. Alternatively, the topology service 132 may include satellite 102C in the list of candidate satellites for service cell 302A with a low priority ranking relative to satellites 102A and 102B, such that the user terminals in the service cell 302A will only attempt to switch to satellite 102C if communications with the other candidate satellites 102A and 102B are unsuccessful. In other words, in some embodiments a satellite associated with a non-independent network path may still be included in the topology schedule data as a back-up option to the multiple independent network paths.

The algorithm used by the topology service 132 to assign satellites 102 to gateway terminals 104 may estimate a traffic parameter for each service cell 302 during each time slot. The traffic parameter may be based on one or more factors such as, but not limited to, a number of user terminals 112 that are expected to be active in the service cell, a maximum bandwidth expected for the service cell, and an amount of latency-sensitive bandwidth (for example, on-line multiplayer gaming is more latency-sensitive than a streaming video, which may be buffered) expected for the service cell. The topology service 132 may arrange SAT-GW links and lists of candidate satellites for each service cell 302 in a way that ensures not only that each service cell is provided with multiple independent network paths, but also that enables each of the network paths available to each service cell to satisfy the traffic parameter for the service cell.

For example, as illustrated in FIG. 5B, certain service cells 302 are shaded darker to indicate a high number of active user terminals during the time slot. It should be understood that the number of active user terminals is just one non-limiting example of the traffic parameter. The topology service 132 may assign both satellite 102A and 102C to gateway terminal 104A based on other constraints, and may assign satellite 102B to gateway terminal 104B. The algorithm used by the topology service 132 may also estimate that the combined traffic in the thirteen darkest-shaded service cells is approximately equivalent to the combined traffic in the remaining cells in the ground area 300. In order to provide both a sufficient link allocation to the high-usage service cells and multiple independent network paths to every service cell, and under the constraint that satellites 102A and 102C do not have independent paths to the ground-based network 102, the algorithm used by the topology service 132 may list satellites 102C and 102B as the candidate satellites in the topology schedule data provided to user terminals in the high-usage service cells, and may list satellites 102A and 102B as the candidate satellites in the topology schedule data provided to user terminals in the remaining service cells in the ground area. Accordingly, traffic from the ground area 300 is divided somewhat evenly between cells that may use satellites 102A and 102C, and satellite 102B provides an independent network path to all service cells in the ground area. It should be understood that other methods of distributing candidate satellites to service cells are also contemplated.

Moreover, as discussed above, in some embodiments, the topology schedule data specifies, on a per service cell 302 basis, a priority sequence in which the user terminals 112 should attempt to establish links with the candidate satellites. The algorithm used by the topology service 132 may further set the priority sequence based on the traffic parameter. Continuing the example above, the topology service 132 may list satellite 102C as the first priority candidate satellite for the high-usage service cells, satellite 102A as the first priority candidate for the remaining service cells, and satellite 102B as the second priority candidate satellite for all of the service cells in the ground area 300.

In other embodiments, as discussed above, the topology schedule data merely identifies, on a per service cell 302 basis, a non-prioritized list of satellites that should be available to establish links, and each user terminal 112 is programmed to select for itself an order in which the user terminal will attempt to establish a link with each of the listed satellites. In some applications, the ability of the user terminals 112 to each seek a satisfactory connection from among the provided list of satellites results in a self-organizing balance of traffic among the satellites. In addition, with regard to the previously noted combination approach, the topology schedule data may identify a higher priority tier of multiple candidate satellites from among which the user terminal 112 can select first, and a lower or de-prioritized tier of one or more candidate satellites to serve as back-ups if the user terminal does not establish a satisfactory connection using the higher priority tier. For example, if satellites 102A and 102C each link with gateway terminal 104A during the particular time slot, satellite 102C may be listed as a de-prioritized option for service cells that receive satellite 102A as a prioritized candidate, and satellite 102A may be listed as a de-prioritized option for service cells that receive satellite 102C as a prioritized candidate.

Although the above example illustrated providing two independent network paths for service cells 302 in the ground area 300, in some embodiments three or more independent network paths may be provided for each service cell in the ground area. For example, in some applications the topology service 132 may further assign satellite 102C to gateway terminal 104C for the particular time slot, thereby making three independent network paths through the satellite communication system 100 available via satellites 102A, 102B, and 102C. Additionally or alternatively, in certain embodiments four or more satellites 102 may be within communication range of service cells in the ground area 300, giving the algorithm used by the topology service 132 more flexibility in establishing a greater number of independent network paths through the satellite communication system 100 for one or more service cells 302.

User Terminal Configured for Reactive Switching Among Satellites

The UT computer system 113 may be configured to detect a deviation from a communication quality threshold in the communication path associated with the active UT-SAT link, and to react to the detection by automatically switching to a different candidate satellite in the topology schedule data for the time slot. Advantageously, because the topology service 132 has ensured that the different candidate satellite is connected to the ground-based network 120 via a different gateway terminal 104 and, if used, a different set of satellites in the satellite mesh topology 107, the reactive switch initiated by the user terminal automatically avoids the root cause of the problem or delay in the original communication path through the satellite communication system 100.

For example, at or near the beginning of a first time slot, the UT computer system 113 may establish a UT-SAT link with one of the candidate satellites 102, for example satellite 102A, identified in the topology schedule data, previously downlinked to the user terminal 112 by the satellite communication system 100, for the first time slot. The satellite 102A may be connected to the ground-based network 120 via path 170A, which includes the gateway terminal 104A during the first time slot. The previously received topology schedule data may further identify satellite 102B as another candidate satellite for the first time slot. The satellite 102B may be connected to the ground-based network 120 via path 170B, which includes the gateway terminal 104B during the first time slot. As discussed above, the communication between satellite 102A and gateway terminal 104A may be direct via a SAT-GW link, or may be indirect via one or more SAT-SAT links with other satellites in the satellite mesh topography 107 (shown in FIG. 1B) and then through a SAT-GW link from the final satellite in the mesh. Likewise, the communication between satellite 102B and gateway terminal 104B may be direct via a SAT-GW link, or may be indirect via one or more SAT-SAT links with other satellites in the satellite mesh topography 107 and then through a SAT-GW link from the final satellite in the mesh. If one or both of the paths 170A and 170B utilizes the satellite mesh topology, the topology service 132 arranges the SAT-SAT links such that no satellites 102 in either path are common to both paths.

During the first time slot, the UT computer system 113 may command the phased array antenna of the user terminal 112 to transmit a first one or more data requests to satellite 102A. For example, the one or more data requests may be directed to a ground-based server 150 on the ground-based network 120. However, during the first time slot and subsequent to transmitting the first one or more data requests, the UT computer system 113 may detect a deviation from a communication quality threshold on a communication path between the phased array antenna and the home PoP 140A associated with the user terminal 112. Notably, the UT computer system 113 likely does not know, and does not need to know, which component or event associated with the original network path 170A is a cause of the problem or delay associated with the deviation. During the first time slot, and in response to detecting the deviation, the UT computer system 113 commands the phased array antenna to transmit a second one or more data requests to another of the candidate satellites identified for the first time slot, such as satellite 102B. Because satellite 102B is part of a second network path 170B that is independent of network path 170A, any component or event associated with the original network path 170A that was a cause of the problem or delay is automatically circumvented.

Notably, the problem or delay that causes the switch to a different satellite is detected locally at the user terminal 112, and the responsive decision to make the switch to a different satellite is also made locally at the user terminal 112. In other words, no delay is introduced by waiting for the central SatOps service 130 to detect or evaluate problems or make decisions, and to relay the result to the user terminal 112. In some applications, it has been observed that, in order to present a seamless network experience to users at the user terminal 112, it is preferable to trigger a reactive switch to a different satellite/independent network path within a time frame of less than or equal to about 500 milliseconds after a network communication interruption occurs, and even more preferable to trigger a reactive switch to a different satellite/independent network path within a time frame of less than or equal to about 300 milliseconds after a network communication interruption occurs. The local user terminal decision-and-response approach disclosed herein provides an advantage over conventional systems that may require participation by a central network server in order to trigger a switch of a user terminal to a different network path in response to network problems. In particular, in a conventional system, the latency introduced by central network participation, in itself, may use a significant portion of, or even a longer duration than, these preferable time frames, as the central network server must communicate back through a gateway terminal to a satellite in order to trigger a switch in such schemes. In contrast, the local user terminal detection-and-response approach disclosed herein for triggering a reactive switch to a different satellite/independent network path avoids such backhaul latency.

The UT computer system 113 may track one or more parameters or events associated with the UT-SAT link in order to detect a deviation that triggers the reactive switch to a different candidate satellite. In some embodiments, the UT computer system 113 is programmed to track a delay time in receiving data from the current satellite as part of the communication quality threshold. For example, each time a data packet is received over the UT-SAT link, the UT computer system 113 resets a delay timer to zero and then regularly compares the delay timer value to a preset delay parameter. If the delay timer value exceeds the preset delay parameter, the UT computer system 113 identifies a deviation based on the delay.

In some such embodiments, in order to ensure that a period of user inactivity at the user terminal 112 does not inadvertently trigger a false interruption event, the UT computer system 113 is programmed to repetitively ping the POP 140 associated with the gateway terminal 104 scheduled for communication with the current satellite. The preset delay parameter is set greater than or equal to the timing at which ping responses are expected to arrive. For example, but not by way of limitation, the ping rate may be set to 10 Hz, and the corresponding preset delay parameter may be set at or above 100 milliseconds since the user terminal 112 may then be expected to receive data on the UT-SAT link including, at minimum, a regular ping response ten times per second.

As a number of active user terminals 112 on the satellite communication system 100 grows, the bandwidth required for each user terminal to ping the POP 140 in order to quickly identify network communication interruptions becomes an increasing burden on the satellite communication system 100. Accordingly, in some embodiments, one or more other methods may be implemented at the UT computer system 113 to identify a deviation from the communication quality threshold. These other methods, singly or in combination, may reduce or eliminate a need for the UT computer system 113 to ping the POP 140 to ensure timely detection of deviations from the communication quality threshold.

The one or more other methods may include tracking, by the UT computer system 113, layer 2 (MAC layer) protocol data unit (PDU) decode errors for data received from the current satellite during the time slot. In some applications, a presence of relatively numerous PDU decode errors may be an early indicator of a deviation from a communication quality threshold such as a low signal-to-noise ratio and/or interference in the UT-SAT link (specifically in the downlink from the current satellite 102 to the user terminal 112), for example. If the tracked PDU decode errors exceed a preset decode-error parameter, the UT computer system 113 identifies a deviation based on the tracked MAC PDU decode errors. In some embodiments, the tracked decode errors may include errors detected in the generic MAC header (GMH) of the PDU. Moreover, in some such embodiments, the tracked decode errors may further include errors detected in the Multiplexing Extended Header (MEH), which is an extension to the header that may be used when the PDU includes payloads from multiple network connections multiplexed in the same PDU. However, the inclusion in the tracked value of additional or alternative types of MAC PDU errors is also contemplated.

For example, the preset decode-error parameter may include a percentage-error parameter, and the UT computer system 113 may track a PDU decode error rate. If a percentage of PDUs received during the time slot (or during a current sub-period within the time slot) exceeds the percentage-error parameter, the UT computer system 113 identifies a deviation. In some embodiments, the sub-period for tracking of PDU decode errors is set to 200 milliseconds, and the preset decode-error parameter includes a percentage-error parameter of 25 percent. However, other sub-period lengths or percentage-error parameter values are also contemplated. Additionally or alternatively, the preset decode-error parameter may include a consecutive-error parameter, and the UT computer system 113 may track consecutive PDU decode errors. If PDU decode errors occur in consecutive fashion throughout the time slot (or during a current sub-period within the time slot), the UT computer system 113 identifies a deviation. Other types of decode-error parameters are also contemplated.

The one or more other methods may also include tracking out-of-sequence layer 2 (MAC layer) service data units (SDU) in data received from the current satellite during the time slot. In some applications, SDU out-of-sequence errors may be an indicator of a deviation from a communication quality threshold, such as PDUs packaged on the current satellite being dropped before being successfully transmitted by the antenna, or an otherwise low signal-to-noise ratio and/or interference in the UT-SAT link (specifically in the downlink from the current satellite 102 to the user terminal 112), for example. If the tracked SDU out-of-sequence errors exceed a preset out-of-sequence-error parameter, the UT computer system 113 identifies a deviation based on the tracked SDU out-of-sequence errors.

For example, the preset SDU out-of-sequence-error parameter may include a percentage-error parameter, and the UT computer system 113 may track an SDU out-of-sequence error rate. If a percentage of SDUs received out of sequence during the time slot (or during a current sub-period within the time slot) exceeds the SDU out-of-sequence-error parameter, the UT computer system 113 identifies a deviation. In some embodiments, the sub-period for tracking of SDU out-of-sequence errors is set to 300 milliseconds, and the preset SDU out-of-sequence-error parameter includes a percentage-error parameter of 25 percent. However, other sub-period lengths or percentage-error parameter values are also contemplated. Notably, tracking of out-of-sequence SDUs is effective only while the user terminal 112 is regularly receiving data from the current satellite. It is contemplated that tracking SDU out-of-sequence errors may be used in conjunction with one or more other methods described herein, or other suitable methods, to detect deviations from a communication quality threshold in an absence of regular data received from the current satellite.

The one or more other methods may also include tracking layer 3 (network layer) packet loss in data received from the current satellite during the first time slot. In some applications, layer 3 packet loss errors may be an early indicator of a deviation from a communication quality threshold such as one or more of (1) over-subscription of user terminals 112 for service on the current satellite (or on a specific beam of the phased array antenna of the current satellite), (2) over-utilization of the gateway terminal transmit beam used for the SAT-GW link of the current satellite, (3) a high block error rate in the SAT-GW link of the current satellite, or (4) a fiber link problem between the ground-based network 120 and the gateway terminal 104 maintaining the SAT-GW link with the current satellite. If the tracked network-layer packet loss error exceeds a preset network-layer packet loss parameter, the UT computer system 113 identifies a deviation based on the tracked network-layer packet loss error.

For example, the preset network-layer packet loss parameter may include a percentage-loss parameter, and the UT computer system 113 may track a network-layer packet loss rate. For example, the UT computer system 113 may identify packet loss based on a count of packets received compared to an expected number of packets. The expected number of packets may be derived, for example, from a sequence number inserted into a sub-header of the packet by the satellite communication system 100. In other words, by tracking the sequence numbers of the packets successfully received by the UT computer system 113, the UT computer system 113 can estimate how many intervening packets should have been, but were not, received.

If a percentage of packets lost during the time slot (or during a current sub-period within the time slot) exceeds the network-layer packet loss parameter, the UT computer system 113 identifies a deviation. In some embodiments, the sub-period for tracking of network-layer packet loss is set to 500 milliseconds, and the preset network-layer packet loss parameter includes a percentage-error parameter of 25 percent. Such a 500 millisecond sub-period, which is longer than the 200-300 millisecond time frame for example embodiments of other methods described herein, may represent a trade-off between processing power needed for layer 3 tracking and early detection of communication problems. However, other sub-period lengths or percentage-error parameter values are also contemplated. Notably, tracking of network-layer packet loss is effective only while the user terminal 112 is regularly receiving data from the current satellite. It is contemplated that tracking network-layer packet loss may be used in conjunction with one or more other methods described herein, or other suitable methods, to detect deviations from a communication quality threshold in an absence of regular data received from the current satellite.

The methods described above may be used singly or in any combination to reduce or eliminate a need for the UT computer system 113 to regularly ping the POP 140 on the current network path in order to detect a communication problem within an acceptable time frame. As noted above, a large number of active user terminals 112 sending pings at a frequency such as ten times per second may use an unacceptable portion of the available bandwidth on the satellite communication system 100. However, in some embodiments, as a backstop measure to be used in conjunction with one or more of the other methods described above for early detection of a deviation from a communication quality threshold, the UT computer system 113 is programmed to ping the POP 140 on the current network path at a much slower frequency, such that a load on the system bandwidth is acceptable. For example, but not by way of limitation, the ping rate may be set to 1 Hz, and the corresponding preset delay parameter may be set at or above 1 second. As compared to the use of pinging as a primary method for rapid detection of communication problems, which requires a higher ping frequency (for example 10 Hz), this lower-frequency backstop approach greatly reduces bandwidth usage, and the resulting slower detection time may be acceptable since almost all types of communication interruptions or delays will be detected more quickly by one or more of the other methods described above.

In some circumstances, when the UT computer system 113 attempts a reactive switch to another satellite in the list of candidate satellites, the other satellite may not properly respond to the attempted connection from the user terminal. For example, in response to attempted connections from user terminals 112, the satellites 102 may be configured to transmit an uplink grant identifying the requesting user terminal 112 in order to establish the requested UT-SAT connection. If no uplink grant is transmitted after the first request from the user terminal, conventional systems typically require the user terminal to make one or more additional connection attempts before determining that no connection may be available. However, in the context of a reactive switch, in which the user terminal has by definition just been subjected to a communication problem on a network path through a first satellite, requiring multiple connection attempts with the second satellite may be an unacceptable additional delay with regard to user experience. Therefore, in some embodiments, the UT computer system 113 may further be programmed to automatically switch to a third satellite in the list of candidate satellites for the first time slot if the second satellite does not provide an uplink grant in response to the first connection request.

More specifically, after the deviation from the communication quality threshold on the first network path associated with the first satellite has been detected and the UT computer system 113 has transmitted the second one or more data requests, including a request for an uplink grant, to the other (second) satellite during the first time slot, the UT computer system 113 may monitor data received from the second satellite for uplink grant information for the user terminal, and, in response to detecting an absence of the uplink grant in data received from the other of the candidate satellites, command the phased array antenna to transmit the second one or more data requests to a third one of the candidate satellites identified for the first time slot. This approach may advantageously prevent a connection delay with the second satellite from compounding an effect on the user experience of the communication problem encountered on the first network path.

User Terminal Configured for Proactive Switching Among Satellites

In some embodiments, in addition or alternatively to reactively switching to a different, independent path through the satellite communication system 100 in response to detecting an unforeseen deviation from a communication quality threshold, the UT computer system 113 is also programmed to proactively switch to a different path during a time slot based on a priori knowledge that a communication interruption is imminent. For example, the UT computer system 113 selects a first satellite 102 in the topology schedule data for a particular time slot and establishes a UT-SAT link with the selected satellite 102 when the time slot arrives. However, the UT computer system 113 also detects that, as the beam of the phased array antenna of the user terminal 112 tracks the linked first satellite across the sky during the time slot, at some point in time the first satellite 102 will cross into one or more lines of sight indicated by the stored obstruction information to be obstructed. Prior to or at the arrival of that point in time, the UT computer system 113 may proactively switch away from the UT-SAT link with the first satellite and establish a UT-SAT link with a different satellite in the topology schedule data to avoid a communication interruption caused by the obstructed line of sight to the first satellite.

Figure 6A:
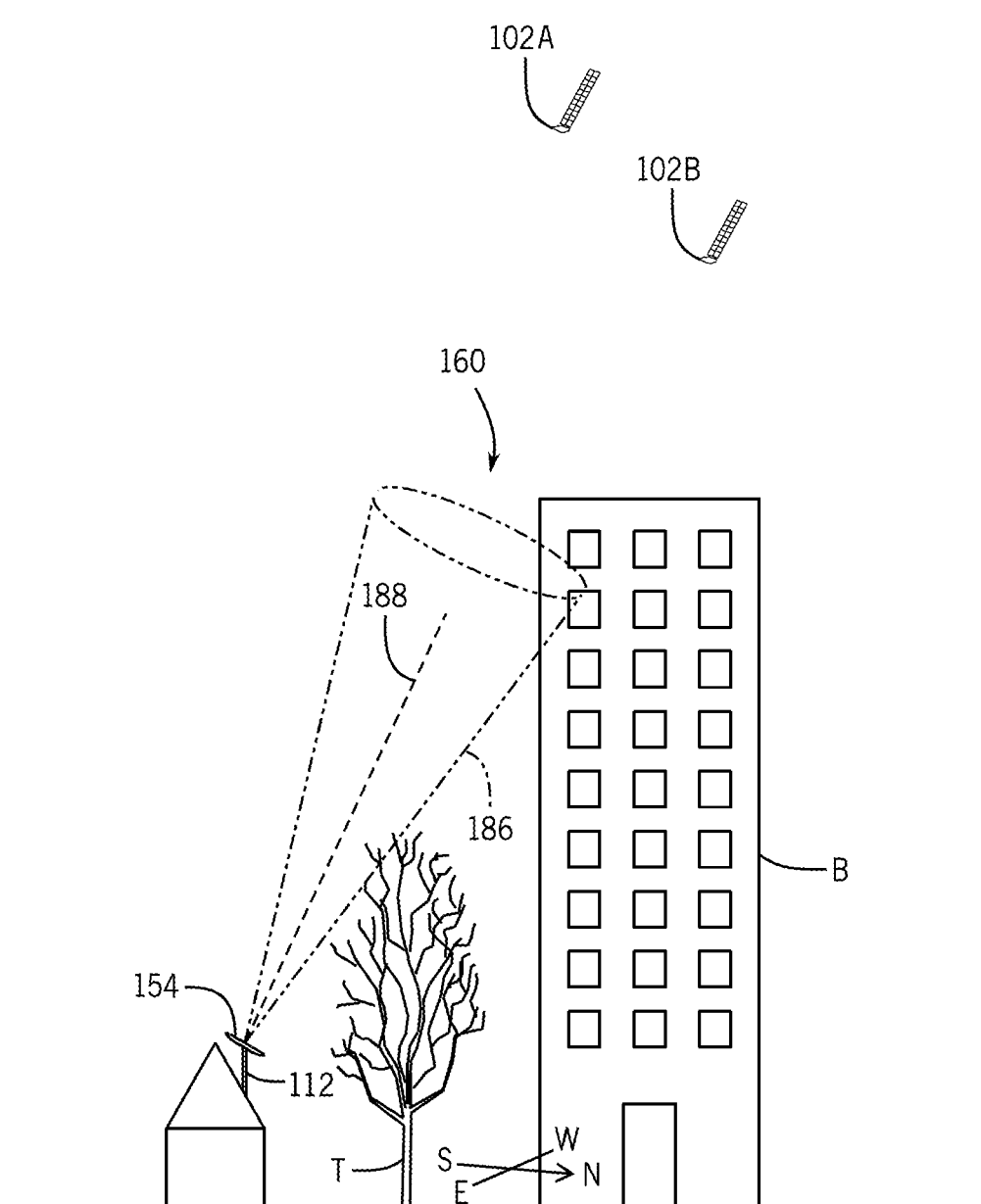
FIG. 6A illustrates a not-to-scale schematic diagram of a communication zone of a user terminal adjacent to obstructing features in accordance with embodiments of the present disclosure.
Figure 6B:
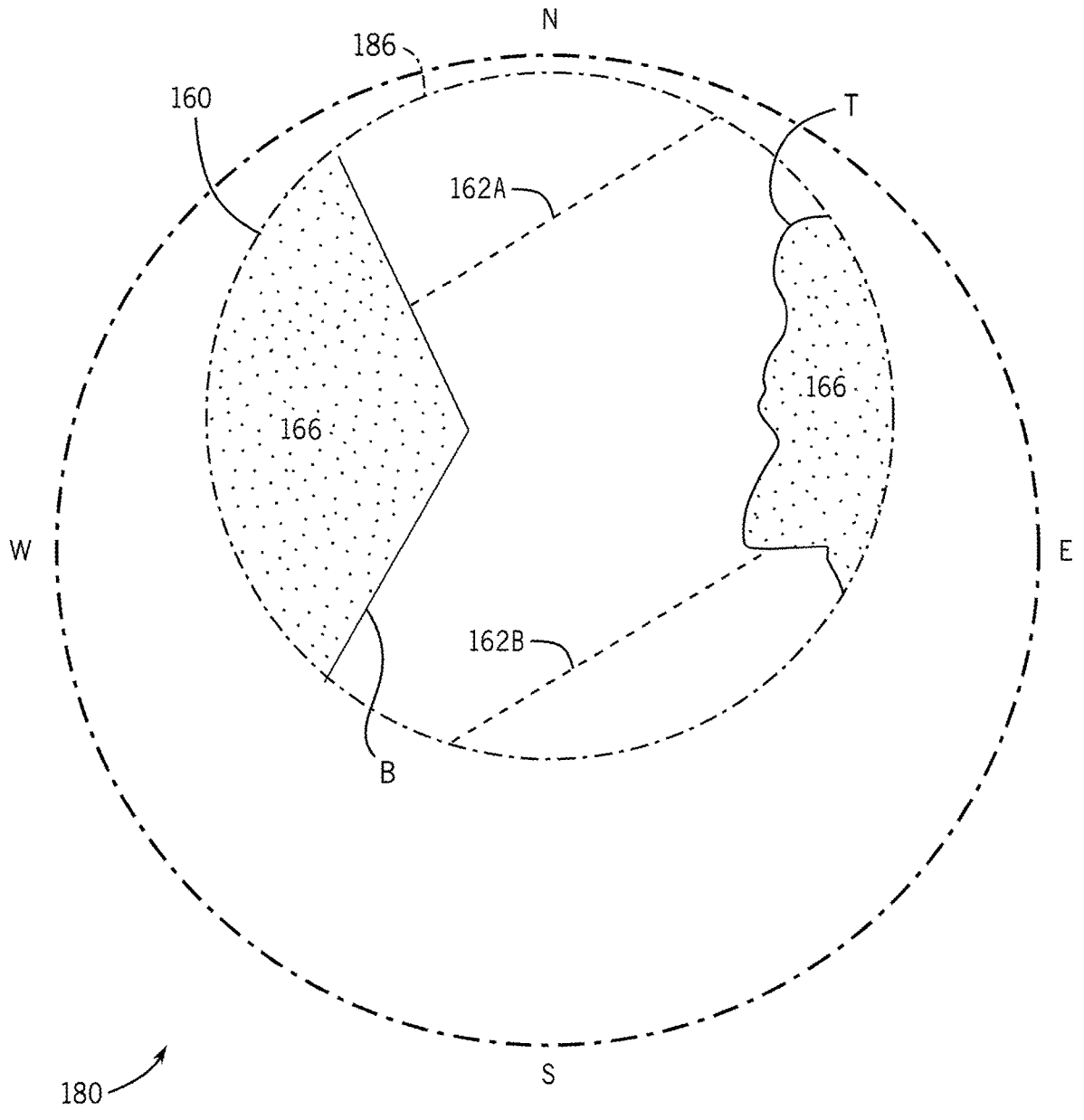
FIG. 6B illustrates a schematic representation of a sky-facing view of the user terminal of FIG. 6A, including obstruction zones, in accordance with embodiments of the present disclosure.

An example is illustrated in FIGS. 6A and 6B. In accordance with the embodiments of the present disclosure, the user terminal 112 may be incapable of steering the main beam generated by its phased array antenna 154 to address the entire hemisphere of the sky, as defined by the local horizon of the location of the user terminal 112 on the Earth. This steering limitation may be the result of mechanical, regulatory, or electrical limitations of the beam steering technology used in the user terminal. The area in which the main beam of the phased array antenna 154 is capable of being steered for communication is referred to as the field of regard 160, which also defines a communication zone 186 of the user terminal.

The field of regard may be oriented about a central boresight vector 188 of the user terminal 112. In the example illustrated in FIG. 6A, the user terminal 112 is installed such that the central boresight vector 188 has a component parallel to the local ground oriented generally in a northern direction. However, other orientations are also contemplated. The shape of the field of regard 160 may be defined by the shape of an aperture of the phased array antenna 154. In a non-limiting example where the antenna aperture is circular, the field of regard 160 may be generally conically shaped. In a non-limiting example where the antenna aperture is square, the field of regard 160 may be generally pyramidal. The field of regard 160 is a function of the angle the phased array antenna 154 can steer the main beam from its boresight vector 188. In the case of an electrically steered phased array antenna 154, the field of regard is limited to less than the total sky view at a specific location.

The UT computer system 113 may store, in a local memory, information associating certain lines of sight within the field of regard of the phased array antenna with a reduced communication capacity or a reduced reliability of UT-SAT links established at that line of sight. The UT computer system 113 may consider such lines of sight to be "obstructed." For example, in the example illustrated in FIG. 6A, there is a building B located to the northwest of the user terminal 112, and a tree T located to the northeast of the user terminal 112. As a result, the field of regard 160 includes multiple obstructions. More specifically, as illustrated by the sky-facing view 180 in FIG. 6B of the communication zone 186 from the user terminal 112, a tree T and a building B are visible within the field of regard 160, resulting in obstructed line-of-sight zones 166. Obstruction information identifying the obstructed lines of sight within the obstruction zones 166 is stored in a local memory accessible to the UT computer system 113.

In the example, the UT computer system 113 receives, prior to an initial time slot of a plurality of time slots, topology schedule data specifying at least two candidate satellites of the plurality of satellites 102 as being available for UT-SAT links during each of the plurality of time slots. As explained above, each of the candidate satellites 102 may be scheduled to communicate with a different one of the plurality of gateway terminals 104 during each time slot. In other words, the at least two satellites for each time slot provide independent network paths through the satellite communication system 100 during the time slot. For example, for a first time slot of the plurality of time slots, the list of candidate satellites includes satellite 102A and 102B. During the first time slot, satellite 102A communicates with the ground-based network 120 via path 170A, which includes the gateway terminal 104A, and satellite 102B communicates with the ground-based network 120 via path 170B, which includes the gateway terminal 104B. As discussed above, the communication between satellite 102A and gateway terminal 104A may be direct via a SAT-GW link, or may be indirect via one or more SAT-SAT links with other satellites in the satellite mesh topography 107 (shown in FIG. 1B) and then through a final satellite in the mesh to the gateway terminal 104A via a SAT-GW link. Likewise, the communication between satellite 102B and gateway terminal 104B may be direct via a SAT-GW link, or may be indirect via one or more SAT-SAT links with other satellites in the satellite mesh topography 107 and then through a final satellite in the mesh to the gateway terminal 104B via a SAT-GW link. If one or both of the paths 170A and 170B utilizes the satellite mesh topology, the topology service 132 arranges the SAT-SAT links such that no satellites 102 in either path are common to both paths during the time slot.

Prior to the first time slot, the UT computer system 113 determines, based on the obstruction information, that one of the candidate satellites identified for the first time slot will become obstructed for at least one portion of the first time slot. For example, in the sky view of FIG. 6B, the flyover path of satellite 102A through the field of regard 160 of the user terminal is illustrated by the line 162A, and the flyover path of satellite 102B through the field of regard 160 of the user terminal is illustrated by the line 162B. The obstruction information stored in the memory indicates that satellite 102B will be obstructed during a latter portion of the first time slot, and satellite 102A will be obstructed for an early portion of the first time slot.

In association with the arrival of the first time slot, the UT computer system 113 may determine to initiate a UT-SAT link with satellite 102B. For example, the topology schedule data may specify a priority sequence for the candidate satellites, and satellite 102B may be first in the priority sequence. For another example, the topology schedule data may specify a priority sequence for the candidate satellites, satellite 102A may be first in the prioritized list, and the UT computer system 113 may be programmed to override the list priority based on the obstruction information for the first priority satellite. For another example, the topology schedule data may specify a non-prioritized list of the candidate satellites, and the UT computer system 113 may apply an algorithm to select satellite 102B from the non-prioritized list for the first portion of the time slot. The algorithm used by the UT computer system 113 to select the satellite 102B from the non-prioritized list may include comparing flyover paths of the candidate satellites to obstruction information stored in the memory, wherein the obstruction information identifies obstructed lines of sight of the phased array antenna.

During portions of the first time slot other than the at least one portion for which an obstruction was identified, the UT computer system 113 commands the phased array antenna 154 to transmit a first one or more data requests to the one of the candidate satellites identified for the first time slot. For example, during the early portion of the first time slot, the UT computer system 113 sends request for user data to satellite 102B. However, during the at least one portion of the first time slot for which an obstruction was identified, the UT computer system 113 commands the phased array antenna 154 to transmit a second one or more data requests to another of the candidate satellites identified for the first time slot, such as satellite 102A. In other words, the UT computer system 113 determines the time at which the flyover path 162B of satellite 102B will cross into one of the obstructed line-of-sight zone 166, and at that time, the UT computer system 113 switches to satellite 102A for communications through the satellite communication system 100. The UT computer system 113 may select satellite 102A as a "backup" satellite for the first time slot based on a determination that the flyover path 162A of satellite 102A remains outside the obstructed line-of-sight zone 166 during those times when the track 162B of satellite 102B lies within the obstructed line-of-sight zone 166.

Although the flyover path 162 of each satellite is illustrated as passing through the obstructed line-of-sight zone 166 adjacent to an edge of the field of regard 160, it is contemplated that the obstructed line-of-sight zone 166 for at least one satellite may lie in a central portion of the field of regard. In such a case, the UT computer system 113 may initiate a proactive switch from the first satellite to the second satellite when the first satellite reaches the central obstructed line-of-sight zone 166, and may initiate another proactive switch from the second satellite back to the first satellite when the first satellite exits the central obstructed line-of-sight zone 166. Likewise, although only two candidate satellites are illustrated in the example, proactive switching among more than two satellites is also contemplated. For example, the flyover paths 162 of both of the first two satellites may lie within the obstructed line-of-sight zone 166 during a same portion of the first time slot, and in response the UT computer system 113 may switch to a UT-SAT link with a third candidate satellite during that portion of the first time slot.

In some embodiments, in addition to the proactive switching described above, the UT computer system 113 may further be programmed to implement reactive switching in response to unforeseen deviations from a communication quality threshold, as described previously herein. For example, before a switch during the first time slot from a first satellite to a second satellite based on the locally stored obstruction information, the UT computer system 113 may detect a deviation from a communication quality threshold between the phased array antenna 154 and the ground network PoP 140. In response to the detection, the UT computer system 113 may command the phased array antenna to transmit a third one or more data requests either to the second satellite, or to a third candidate satellite of the plurality of satellites. The UT computer system 113 may select the satellite for the reactive switch based on the obstruction information.

In some cases, it is not possible to predict precisely how many network packets addressed to the user terminal 112 and routed through satellite 102A will actually be transmitted to the user terminal 112 before the user terminal executes the proactive switch to satellite 102B. Accordingly, in response to the user terminal executing the proactive switch to satellite 102B, the satellite communication system 100 can be configured to send a number of duplicate network packets (that is, duplicates of the last data sent via the gateway terminal 104A and satellite 102A) to the user terminal via the gateway terminal 104B and the satellite 102B to ensure that the user terminal 112 does not miss any network packets. In other words, the system can send traffic simultaneously on both paths 170A and 170B for a short period of time to ensure there is no gap in the data.

FIG. 7A illustrates an example method 700 related to communications in a satellite communication system between a user terminal and a ground-based network. The satellite communication system can include a plurality of satellites and a plurality of gateway terminals. The user terminal can be assigned to a ground network point-of-presence (POP) and can include a phased array antenna, an interface device configured for electronic communication with local user computing devices, and at least one processor. The method 700 can include steps performed by the at least one processor including one or more of: receiving, from one of a plurality of satellites via a phased array antenna of the user terminal and prior to an initial time slot of a plurality of time slots, topology schedule data specifying at least two candidate satellites of a plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the ground network PoP (704); during a first of the time slots, commanding the phased array antenna to transmit a first one or more data requests to one of the candidate satellites identified for the first time slot (708); during the first time slot and subsequent to transmitting the first one or more data requests, detecting a deviation from a communication quality threshold on a communication path between the phased array antenna and the ground network PoP (712); and during the first time slot and in response to detecting the deviation, commanding the phased array antenna to transmit a second one or more data requests to another of the candidate satellites identified for the first time slot (716).

A system embodiment can include a user terminal for a satellite communication system that includes a plurality of satellites and a plurality of gateway terminals. The user terminal is assigned to a ground network point-of-presence (POP) and can include an interface device configured for electronic communication with local user computing devices, a phased array antenna, at least one processor, and a computer-readable storage device storing instructions. The instructions, when executed by the at least one processor, cause the at least one processor to perform operations including one or more of: receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the PoP; during a first of the time slots, commanding the phased array antenna to transmit a first one or more data requests to one of the candidate satellites identified for the first time slot; during the first time slot and subsequent to transmitting the first one or more data requests, detecting a deviation from a communication quality threshold on a communication path between the phased array antenna and the ground network POP; and during the first time slot and in response to detecting the deviation, commanding the phased array antenna to transmit a second one or more data requests to another of the candidate satellites identified for the first time slot.

In some embodiments, detecting the deviation can include, during the first time slot, repetitively pinging the ground network PoP, and in response to a delay time in receiving data from the one of the satellites exceeding a preset delay parameter, detecting the deviation. For example, the repetitive pinging may be performed at a frequency less than or equal to 1 Hz.

In certain embodiments, detecting the deviation can additionally or alternatively include, during the first time slot, tracking protocol data unit (PDU) decode errors for data received from the one of the candidate satellites during the first time slot, and in response to the tracked decode errors exceeding a preset decode-error parameter, detecting the deviation.

In some embodiments, detecting the deviation can additionally or alternatively include, during the first time slot, tracking out-of-sequence service data unit (SDU) packets in data received from the one of the candidate satellites during the first time slot, and in response to the tracked out-of-sequence packets exceeding a preset out-of-sequence parameter, detecting the deviation.

In certain embodiments, detecting the deviation can additionally or alternatively include during the first time slot, tracking packet loss in data received from the one of the candidate satellites during the first time slot, and in response to the tracked packet loss exceeding a preset packet-loss parameter, detecting the deviation.

In some embodiments, the second one or more data requests includes a request for an uplink grant from the other of the satellites, and the method steps or processor operations can additionally or alternatively include, subsequent to transmitting the request for the uplink grant, detecting an absence of the uplink grant for the user terminal in data received from the other of the candidate satellites, and during the first time slot and in response to detecting the absence of the uplink grant, commanding the phased array antenna to transmit the second one or more data requests to a third one of the candidate satellites identified for the first time slot.

In certain embodiments, the topology schedule data specifies a priority sequence for the candidate satellites, and the method steps or processor operations can additionally or alternatively include selecting a primary satellite in the priority sequence as the one of the candidate satellites, and selecting a backup satellite in the priority sequence as the other of the candidate satellites.

In some embodiments, the topology schedule data specifies a non-prioritized list of the candidate satellites, and the method steps or processor operations can additionally or alternatively include applying an algorithm to select the one of the candidate satellites and the other of the candidate satellites. In some such embodiments, the algorithm includes comparing flyover paths of the candidate satellites to obstruction information stored in the memory, wherein the obstruction information identifies obstructed lines of sight of the phased array antenna.

FIG. 7B illustrates an example method 720 performed at a user terminal and related to communications in a satellite communication system between the user terminal and a ground-based network. The satellite communication system can include a plurality of satellites and a plurality of gateway terminals. The user terminal can be assigned to a ground network point-of-presence (POP) and can include a phased array antenna, an interface device configured for electronic communication with local user computing devices, and at least one processor. The method 720 can include steps performed by the at least one processor including one or more of: storing obstruction information in a memory of the user terminal, wherein the obstruction information identifies one or more obstructed lines of sight of a phased array antenna of the user terminal (724); receiving, from one of a plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the POP (728); determining, based on the obstruction information and prior to a first of the time slots, that one of the candidate satellites identified for the first time slot will become obstructed for at least one portion of the first time slot (732); during portions of the first time slot other than the at least one portion, commanding the phased array antenna to transmit a first one or more data requests to the one of the candidate satellites identified for the first time slot (736); and during the at least one portion of the first time slot, commanding the phased array antenna to transmit a second one or more data requests to another of the candidate satellites identified for the first time slot (740).

A system embodiment can include a user terminal for a satellite communication system that includes a plurality of satellites and a plurality of gateway terminals. The user terminal is assigned to a ground network point-of-presence (POP) and can include an interface device configured for electronic communication with local user computing devices, a phased array antenna, at least one processor, and a computer-readable storage device storing instructions. The instructions, when executed by the at least one processor, cause the at least one processor to perform operations including one or more of: storing obstruction information in a memory of the user terminal, wherein the obstruction information identifies one or more obstructed lines of sight of the phased array antenna; receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the POP; determining, based on the obstruction information and prior to a first of the time slots, that one of the candidate satellites identified for the first time slot will become obstructed for at least one portion of the first time slot; during portions of the first time slot other than the at least one portion, commanding the phased array antenna to transmit a first one or more data requests to the one of the candidate satellites identified for the first time slot; and during the at least one portion of the first time slot, commanding the phased array antenna to transmit a second one or more data requests to another of the candidate satellites identified for the first time slot.

In some embodiments, the topology schedule data specifies a priority sequence for the candidate satellites, and the method steps or processor operations can additionally or alternatively include selecting a primary satellite in the priority sequence as the one of the candidate satellites, and selecting a backup satellite in the priority sequence as the other of the candidate satellites.

In certain embodiments, the topology schedule data specifies a non-prioritized list of the candidate satellites, and the method steps or processor operations can additionally or alternatively include applying an algorithm to select the one of the candidate satellites and the other of the candidate satellites. In some such embodiments, the algorithm includes comparing flyover paths of the candidate satellites to the obstruction information.

In some embodiments, the method steps or processor operations further include one or more of the elements described above with respect to FIG. 7A.

Figure 8:
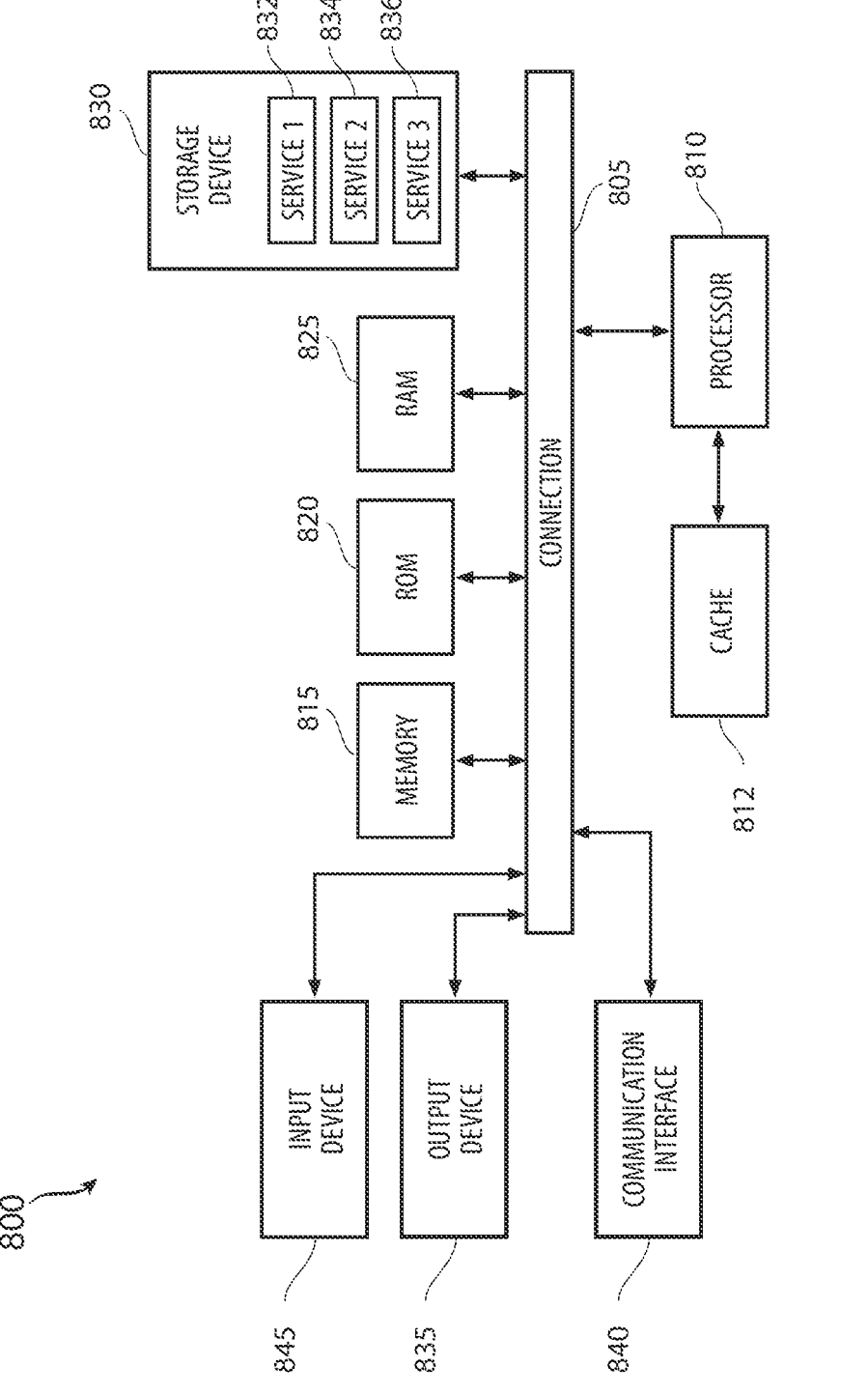
FIG. 8 illustrates a computer system that can be implemented with other aspects of the present disclosure.

FIG. 8 illustrates an example computer device that can be used in connection with any of the systems or components of the UT computer system 113, the gateway 104, the POP 140, the satellite computer system 103, the SatOps services 130, the ground-based server 150, or other components disclosed herein. In this example, FIG. 8 illustrates a computing system 800 including components in electrical communication with each other using a connection 805, such as a bus. System 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1-832, service 2-834, and service 3-836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A user terminal for a satellite communication system, the satellite communication system including a plurality of satellites and a plurality of gateway terminals, the user terminal assigned to a ground network point-of-presence (POP), the user terminal comprising:

an interface device configured for electronic communication with local user computing devices;

a phased array antenna;

at least one processor; and a computer-readable storage device storing instructions, wherein the instructions are executable to cause the at least one processor to perform operations including:

receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the ground network PoP;

during a first of the time slots, commanding the phased array antenna to transmit a first one or more data requests to one of the candidate satellites identified for the first time slot;

during the first time slot and subsequent to transmitting the first one or more data requests, detecting a deviation from a communication quality threshold on a communication path between the phased array antenna and the ground network PoP; and during the first time slot and in response to detecting the deviation, commanding the phased array antenna to transmit a second one or more data requests to another of the candidate satellites identified for the first time slot.

2. The user terminal according to claim 1, wherein the instructions are executable to further cause the at least one processor to detect the deviation by:

during the first time slot, repetitively pinging the ground network POP during the first time slot; and in response to a delay time in receiving data from the one of the satellites exceeding a preset delay parameter, detecting the deviation.

3. The user terminal according to claim 2, wherein the instructions are executable to further cause the at least one processor to perform the repetitive pinging at a frequency less than or equal to 1 Hz.

4. The user terminal according to claim 1, wherein the instructions are executable to further cause the at least one processor to detect the deviation by:

during the first time slot, tracking protocol data unit (PDU) decode errors for data received from the one of the candidate satellites during the first time slot; and in response to the tracked decode errors exceeding a preset decode-error parameter, detecting the deviation.

5. The user terminal according to claim 1, wherein the instructions are executable to further cause the at least one processor to detect the deviation by:

during the first time slot, tracking out-of-sequence service data unit (SDU) packets in data received from the one of the candidate satellites during the first time slot; and in response to the tracked out-of-sequence packets exceeding a preset out-of-sequence parameter, detecting the deviation.

6. The user terminal according to claim 1, wherein the instructions are executable to further cause the at least one processor to detect the deviation by:

during the first time slot, tracking packet loss in data received from the one of the candidate satellites during the first time slot; and in response to the tracked packet loss exceeding a preset packet-loss parameter, detecting the deviation.

7. The user terminal according to claim 1, wherein the second one or more data requests includes a request for an uplink grant from the other of the satellites, and wherein the instructions are executable to further cause the at least one processor to:

subsequent to transmitting the request for the uplink grant, detect an absence of the uplink grant for the user terminal in data received from the other of the candidate satellites; and during the first time slot and in response to detecting the absence of the uplink grant, command the phased array antenna to transmit the second one or more data requests to a third one of the candidate satellites identified for the first time slot.

8. The user terminal according to claim 1, wherein the topology schedule data specifies a priority sequence for the candidate satellites, and wherein the instructions are executable to further cause the at least one processor to select a primary satellite in the priority sequence as the one of the candidate satellites, and to select a backup satellite in the priority sequence as the other of the candidate satellites.

9. The user terminal according to claim 1, wherein the topology schedule data specifies a non-prioritized list of the candidate satellites, and wherein the instructions are executable to further cause the at least one processor to apply an algorithm to select the one of the candidate satellites and the other of the candidate satellites.

10. The user terminal according to claim 9, wherein the user terminal further comprises a memory, wherein the algorithm includes comparing flyover paths of the candidate satellites to an obstruction map stored in the memory, and wherein the obstruction map identifies obstructed lines of sight of the phased array antenna.

11. A user terminal for a satellite communication system, the satellite communication system including a plurality of satellites and a plurality of gateway terminals, the user terminal assigned to a ground network point-of-presence (POP), the user terminal comprising:

an interface device configured for electronic communication with local user computing devices;

a phased array antenna;

at least one processor; and a computer-readable storage device storing instructions, wherein the instructions are executable to cause the at least one processor to perform operations including:

storing obstruction information in a memory of the user terminal, wherein the obstruction information identifies one or more obstructed lines of sight of the phased array antenna;

receiving, from one of the plurality of satellites via the phased array antenna and prior to an initial time slot of a plurality of time slots, topology schedule data specifying at least two candidate satellites of the plurality of satellites as being available for UT-SAT links during each of the plurality of time slots, wherein the candidate satellites are scheduled to communicate with different ones of the plurality of gateway terminals during each time slot, the plurality of gateway terminals each capable of communication with the ground network POP;

determining, based on the obstruction information and prior to a first of the time slots, that one of the candidate satellites identified for the first time slot will become obstructed for at least one portion of the first time slot;

during portions of the first time slot other than the at least one portion, commanding the phased array antenna to transmit a first one or more data requests to the one of the candidate satellites identified for the first time slot; and during the at least one portion of the first time slot, commanding the phased array antenna to transmit a second one or more data requests to another of the candidate satellites identified for the first time slot.

12. The user terminal according to claim 11, wherein the topology schedule data specifies a priority sequence for the candidate satellites, and wherein the instructions are executable to further cause the at least one processor to select a primary satellite in the priority sequence as the one of the candidate satellites, and to select a backup satellite in the priority sequence as the other of the candidate satellites.

13. The user terminal according to claim 11, wherein the topology schedule data specifies a non-prioritized list of the candidate satellites, wherein the instructions are executable to further cause the at least one processor to apply an algorithm to select the one of the candidate satellites and the other of the candidate satellites, and wherein the algorithm includes comparing flyover paths of the candidate satellites to the obstruction information.

14. The user terminal according to claim 11, wherein the instructions are executable to further cause the at least one processor to:

during the portions of the first time slot other than the at least one portion and subsequent to transmitting the first one or more data requests, detect a deviation from a communication quality threshold on a communication path between the phased array antenna and the ground network PoP; and during the portions of the first time slot other than the at least one portion and in response to detecting the deviation, command the phased array antenna to transmit a third one or more data requests to either the other of the candidate satellites identified for the first time slot, or a third candidate satellite of the plurality of satellites.

15. The user terminal according to claim 14, wherein the instructions are executable to further cause the at least one processor to detect the deviation by:

during the portions of the first time slot other than the at least one portion, repetitively pinging the ground network POP associated with the one of the gateway terminals scheduled for communication with the one of the candidate satellites during the first time slot; and in response to a delay time in receiving data from the one of the satellites exceeding a preset delay parameter, detecting the deviation.

16. The user terminal according to claim 15, wherein the instructions are executable to further cause the at least one processor to perform the repetitive pinging at a frequency less than or equal to 1 Hz.

17. The user terminal according to claim 14, wherein the instructions are executable to further cause the at least one processor to detect the deviation by:

during the portions of the first time slot other than the at least one portion, tracking protocol data unit (PDU) decode errors for data received from the one of the candidate satellites during the first time slot; and in response to the tracked decode errors exceeding a preset decode-error parameter, detecting the deviation.

18. The user terminal according to claim 14, wherein the instructions are executable to further cause the at least one processor to detect the deviation by:

during the portions of the first time slot other than the at least one portion, tracking out-of-sequence service data unit (SDU) packets in data received from the one of the candidate satellites during the first time slot; and in response to the tracked out-of-sequence packets exceeding a preset out-of-sequence parameter, detecting the deviation.

19. The user terminal according to claim 14, wherein the instructions are executable to further cause the at least one processor to detect the deviation by:

during the portions of the first time slot other than the at least one portion, tracking packet loss in data received from the one of the candidate satellites during the first time slot; and in response to the tracked packet loss exceeding a preset packet-loss parameter, detecting the deviation.

20. The user terminal according to claim 14, wherein the second one or more data requests includes a request for an uplink grant from the other of the satellites, and wherein the instructions are executable to further cause the at least one processor to:

subsequent to transmitting the request for the uplink grant, detect an absence of the uplink grant for the user terminal in data received from the other of the candidate satellites; and during the first time slot and in response to detecting the absence of the uplink grant, command the phased array antenna to transmit the second one or more data requests to a third one of the candidate satellites identified for the first time slot.

\* \* \* \* \*